US012596626B2

(12) United States Patent
Taggart et al.

(10) Patent No.: US 12,596,626 B2
(45) Date of Patent: Apr. 7, 2026

(54) HIGH-SPEED DEBUG PORT TRACE CIRCUIT

(71) Applicant: Xilinx, Inc., San Jose, CA (US)

(72) Inventors: Elessar Taggart, Longmont, CO (US);
Ishita Ghosh, San Jose, CA (US);
Rishi Bharadwaj Subramanian, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 322 days.

(21) Appl. No.: 18/193,488

(22) Filed: Mar. 30, 2023

(65) Prior Publication Data

US 2024/0330145 A1     Oct. 3, 2024

(51) Int. Cl.
| *G06F 9/44* | (2018.01) |
| *G06F 9/445* | (2018.01) |
| *G06F 9/45* | (2006.01) |
| *G06F 9/455* | (2018.01) |
| *G06F 11/34* | (2006.01) |

(52) U.S. Cl.
CPC ........ *G06F 11/348* (2013.01); *G06F 11/3476* (2013.01)

(58) Field of Classification Search
CPC ........................... G06F 11/348; G06F 11/3476
See application file for complete search history.

(56) References Cited

U.S. PATENT DOCUMENTS

| 7,490,227 | B1 | 2/2009 | Bilski |
| 8,042,007 | B1 | 10/2011 | Chan |
| 8,117,577 | B1 | 2/2012 | Vadi |
| 9,144,150 | B2 | 9/2015 | Wu |
| 10,346,572 | B1 | 7/2019 | Corbett |
| 10,474,610 | B1 | 11/2019 | Schelle |
| 11,442,844 | B1 * | 9/2022 | Peattie ................... G06F 11/27 |
| 12,182,003 | B1 * | 12/2024 | Patwardhan ........ G06F 11/0772 |

(Continued)

OTHER PUBLICATIONS

Jonas Diemer, Real-Time Communication Analysis for Networks with Two-Stage Arbitration, 2011, pp. 243-251., 2011 https://ieeexplore.ieee.org/stamp/stamp.jsp?tp=&arnumber=6064532 (Year: 2011).*

(Continued)

*Primary Examiner* — Mongbao Nguyen
(74) *Attorney, Agent, or Firm* — Kevin T. Cuenot

(57) ABSTRACT

An integrated circuit includes a high-speed debug port trace circuit. The high-speed debug trace circuit includes a plurality of input receiver circuits each configured to receive a stream of trace data. The plurality of input receiver circuits receive streams of trace data from a plurality of compute circuits of different compute circuit types. The plurality of compute circuits are within the integrated circuit. The high-speed debug trace circuit includes a stream selector circuit configured to perform multiple stages of arbitration among the plurality of streams of trace data to generate output trace data. The stream selector circuit inserts compute circuit type identifiers within the output trace data. Each compute circuit type identifier specifies a compute circuit type that originated each portion of trace data of the output trace data. The high-speed debug trace circuit includes an output transmitter circuit configured to output the output trace data.

13 Claims, 13 Drawing Sheets

1400

Receive a plurality of streams of trace data from a plurality of compute circuits of different compute circuit types, wherein the plurality of compute circuits and the high-speed debug port trace circuit are disposed in a same integrated circuit
1402

Perform a first stage arbitration among the plurality of streams of trace data originating from same compute circuit types
1404

Perform a second stage arbitration among streams of trace data corresponding to different compute circuit types generating output trace data
1406

Include compute circuit type identifiers within the output trace data, wherein the compute circuit type identifiers specify the compute circuit type that originated each portion of trace data of the output trace data
1408

Output the output trace data
1410

(56) References Cited

U.S. PATENT DOCUMENTS

| | | | | |
|---|---|---|---|---|
| 2005/0039078 | A1* | 2/2005 | Bradley | G06F 11/348 |
| | | | | 714/E11.203 |
| 2009/0132863 | A1* | 5/2009 | Ashfield | G06F 11/3466 |
| | | | | 714/E11.181 |
| 2009/0150728 | A1* | 6/2009 | Barlow | G06F 11/2294 |
| | | | | 714/E11.159 |
| 2009/0313507 | A1* | 12/2009 | Swaine | G06F 11/348 |
| | | | | 714/E11.2 |
| 2010/0257510 | A1* | 10/2010 | Horley | G06F 11/3636 |
| | | | | 717/128 |
| 2012/0036412 | A1* | 2/2012 | Sugawara | G06F 11/10 |
| | | | | 714/E11.03 |
| 2018/0225063 | A1 | 8/2018 | Singvi | |
| 2019/0303268 | A1* | 10/2019 | Ansari | G06F 11/2733 |
| 2023/0061419 | A1* | 3/2023 | Beaumont-Smith | |
| | | | | G06F 11/3037 |
| 2023/0418724 | A1* | 12/2023 | Beaumont-Smith | |
| | | | | G06F 11/3648 |
| 2024/0330144 | A1 | 10/2024 | Ghosh | |
| 2024/0378062 | A1 | 11/2024 | Mysore | |

OTHER PUBLICATIONS

Jeffrey Goeders, Signal-Tracing Techniques for In-System FPGA Debugging of High-Level Synthesis Circuits, 2017, pp. 83-95. https://ieeexplore.ieee.org/stamp/stamp.jsp?tp=&arnumber=7466842 (Year: 2017).*

Sidhartha Sankar Rout, WiND: An Efficient Post-Silicon Debug Strategy for Network on Chip, 2021, pp. 2372-2384. https://ieeexplore.ieee.org/stamp/stamp.jsp?tp=&arnumber=9295421 (Year: 2021).* https://www.xilinx.com/products/boards-and-kits/smartlynq-plus.html#information, last visited Mar. 30, 2023.

Xilinx, LogicCORE IP Aurora 64B/66B v4.2, DS528 Mar. 1, 2011.

* cited by examiner

100

1400

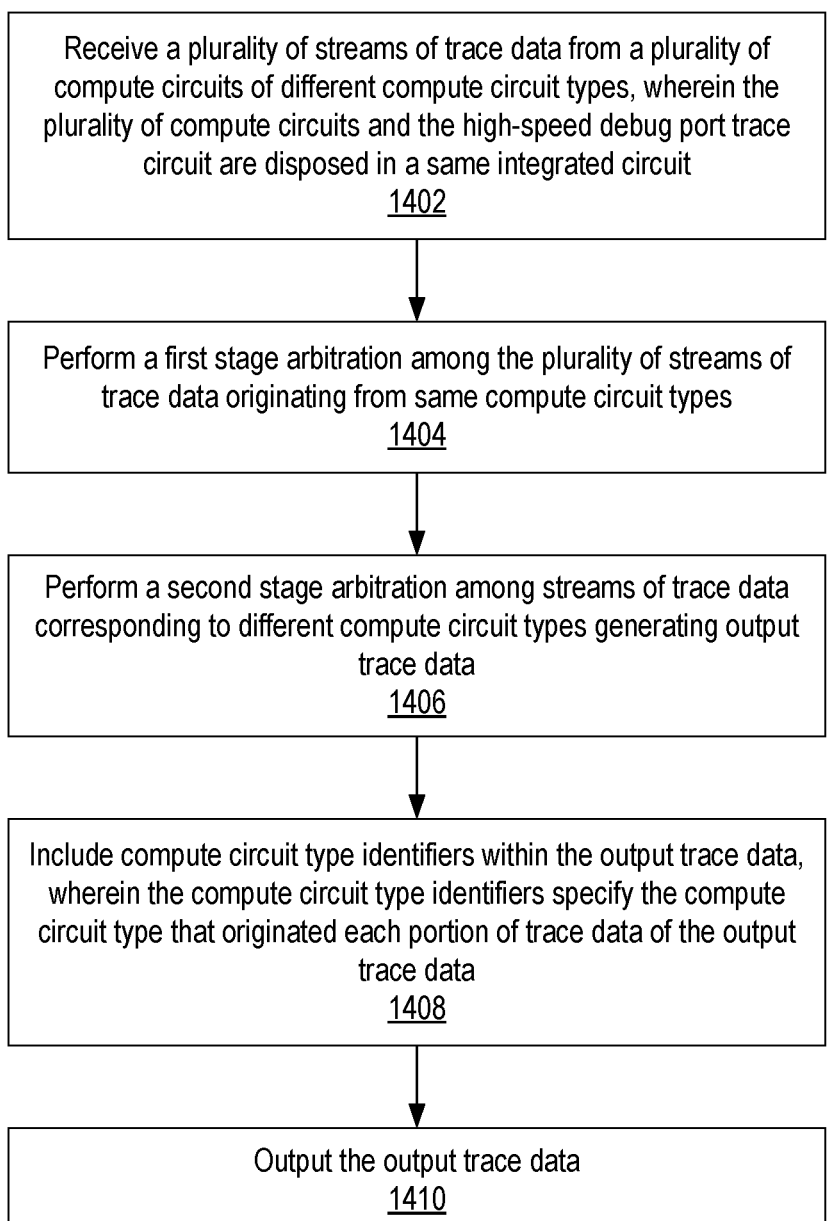

Receive a plurality of streams of trace data from a plurality of
compute circuits of different compute circuit types, wherein the
plurality of compute circuits and the high-speed debug port trace
circuit are disposed in a same integrated circuit
1402

Perform a first stage arbitration among the plurality of streams of
trace data originating from same compute circuit types
1404

Perform a second stage arbitration among streams of trace data
corresponding to different compute circuit types generating output
trace data
1406

Include compute circuit type identifiers within the output trace data,
wherein the compute circuit type identifiers specify the compute
circuit type that originated each portion of trace data of the output
trace data
1408

Output the output trace data
1410

FIG. 14

HIGH-SPEED DEBUG PORT TRACE CIRCUIT

TECHNICAL FIELD

This disclosure relates to integrated circuits (ICs) and, more particularly, to a high-speed debug port trace circuit for use within an IC.

BACKGROUND

Modern integrated circuits (ICs) often include a variety of different types of compute circuits. Examples of compute circuits that may be included in a single IC include, but are not limited to, a processor (e.g., a central processing unit or other processor) configured to execute program code, a dedicated and hardened circuit block configured to perform a particular task, a user-specified circuit implemented in programmable circuitry (e.g., programmable logic), a processor array, a graphics processing unit (GPU), or the like. In developing a design using an IC including a plurality of different types of compute circuits, it is often necessary to collect trace data from the various compute circuits to ensure that the design is operating as intended and/or to debug the design.

In the case of certain types of ICs, e.g., adaptive or programmable ICs, existing techniques for collecting trace data utilize the on-chip programmable logic resources to implement the trace data collection infrastructure and allocate portions of the on-chip memory for storing the trace data. A number of the different types of compute circuits available in ICs are capable of generating large quantities of trace data in short periods of time. This means that the amount of on-chip memory needed to store trace data over even a small window of time may be quite large. Using on-chip programmable logic resources and on-chip memory for storing trace data renders the resources unavailable for use by user circuit designs. In the case of an adaptive IC, for example, this may adversely affect operation of a user design implemented in the IC or limit the overall size of the user design that may be implemented in the IC.

SUMMARY

In one or more example implementations, a method includes receiving, by a high-speed debug port trace circuit, a plurality of streams of trace data from a plurality of compute circuits of different compute circuit types. The plurality of compute circuits and the high-speed debug port trace circuit are disposed in a same integrated circuit. The method includes performing a first stage arbitration among the plurality of streams of trace data originating from same compute circuit types. The method includes performing a second stage arbitration among streams of trace data corresponding to different compute circuit types generating output trace data. The method includes inserting compute circuit type identifiers within the output trace data. Each compute circuit type identifier specifies a compute circuit type that originated each portion of trace data of the output trace data. The method includes outputting the output trace data.

The foregoing and other implementations can each optionally include one or more of the following features, alone or in combination. Some example implementations include all the following features in combination.

In some aspects, the first stage arbitration, for each set of two or more streams of trace data originating from a same compute circuit type, performs a separate arbitration.

In some aspects, for a single stream of trace data received from one or more compute circuits of a selected compute circuit type of the different compute circuit types, the single stream bypasses the first stage arbitration and is arbitrated by the second stage arbitration.

In some aspects, the method includes compressing the plurality of streams of trace data prior to the first arbitration.

In some aspects, the method includes compressing the output trace data prior to the outputting.

In some aspects, the method includes dropping one or more packets of trace data within one or more of the plurality of streams of trace data in response to detecting back pressure or a failed check for expected packet length.

In some aspects, the method includes tracking the one or more packets of trace data that were dropped and storing packet loss information within the high-speed debug port trace circuit. The packet loss information indicates the one or more packets of trace data that were dropped.

In some aspects, the high-speed debug port trace circuit is implemented using programmable circuitry and a number of the plurality of streams of trace data received from each different compute circuit type is user-specified.

In some aspects, at least one of the plurality of compute circuit types is a data processing array configured to provide two or more streams of the plurality of streams of trace data to the high-speed debug port trace circuit.

In some aspects, the high-speed debug port trace circuit operates as an agent of the plurality of compute circuits in receiving the plurality of streams of trace data from the plurality of compute circuits and operates as an agent of a debug packet controller configured to packetize the output trace data for further transmission.

In one or more example implementations, an integrated circuit includes a high-speed debug port trace circuit. The high-speed debug trace circuit includes a plurality of input receiver circuits each configured to receive a stream of trace data. The plurality of input receiver circuits receive streams of trace data from a plurality of compute circuits of different compute circuit types. The plurality of compute circuits are within the integrated circuit. The high-speed debug trace circuit includes a stream selector circuit configured to perform multiple stages of arbitration among the plurality of streams of trace data to generate output trace data. The stream selector circuit inserts compute circuit type identifiers within the output trace data. Each compute circuit type identifier specifies a compute circuit type that originated each portion of trace data of the output trace data. The high-speed debug trace circuit includes an output transmitter circuit configured to output the output trace data.

The foregoing and other implementations can each optionally include one or more of the following features, alone or in combination. Some example implementations include all the following features in combination.

In some aspects, the stream selector circuit includes a plurality of first arbitration circuits. Each first arbitration circuit is configured to perform a first stage of arbitration among the plurality of streams of trace data originating from a same compute circuit type. The stream selector circuit can include a second arbitration circuit configured to arbitrate among streams of trace data corresponding to different compute circuit types.

In some aspects, the first stage of arbitration is performed separately for each set of two or more streams of trace data originating from a same compute circuit type.

In some aspects, for a single stream of trace data received from one or more compute circuits of a selected compute circuit type of the different compute circuit types, the single stream bypasses the first stage arbitration and is arbitrated by the second stage arbitration (e.g., by the second arbitration circuit).

In some aspects, one or more of the plurality of input receiver circuits includes a compressor circuit configured to compress the stream of trace data as received prior to storage of the stream of trace data within a first-in-first-out memory.

In some aspects, the output transmitter circuit includes a compressor circuit configured to compress the output stream of trace data prior to storage of the output stream of trace data within a first-in-first-out memory.

In some aspects, the input receiver circuits are configured to drop one or more packets of trace data within respective ones of the plurality of streams of trace data in response to detecting back pressure or a failed check for expected packet length.

In some aspects, the high-speed debug port trace circuit further includes a controller configured to track packets of trace data dropped from the input streams and a memory coupled to the controller. The controller is configured to store packet loss information within the memory. The packet loss information indicates an amount of trace data that was dropped.

In some aspects, the high-speed debug port trace circuit is implemented using programmable circuitry and a number of the plurality of streams of trace data received from each different compute circuit type is user-specified.

In some aspects, each input receiver circuit operates as an agent of a respective one of the plurality of compute circuits in receiving a respective stream of trace data of the plurality of streams of trace data and the output transmitter circuit operates as an agent of a debug packet controller configured to packetize the trace data of the output stream for further transmission.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 14 illustrates an example method of operation of the HSDP trace circuit.

DETAILED DESCRIPTION

Figure 1:
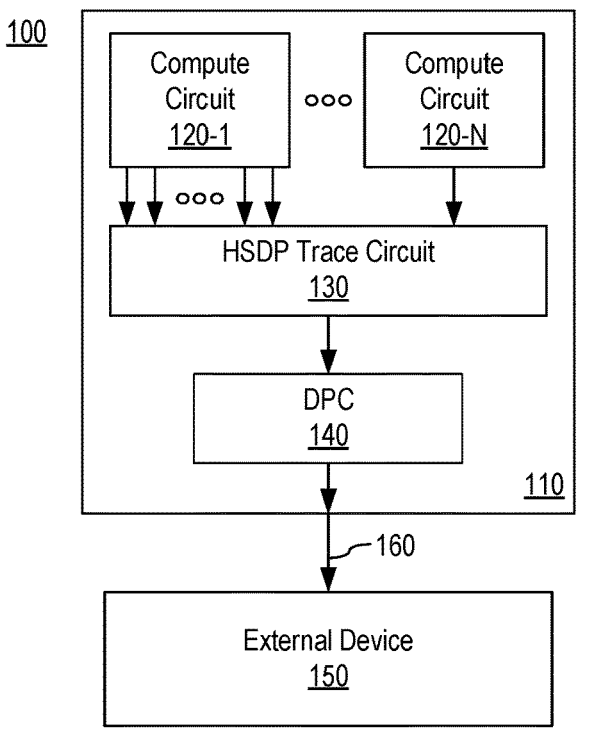
FIG. 1 illustrates an example system for offloading trace data from an integrated circuit.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to a high-speed debug port (HSDP) trace circuit for use within an IC. In accordance with the inventive arrangements described within this disclosure, an HSDP trace circuit is disclosed that is capable of receiving trace data from one or more different types of compute circuits within an IC. More particularly, the HSDP trace circuit is capable of receiving a plurality of different streams of trace data from the various compute circuits of the IC. The HSDP trace circuit is capable of collecting the received trace data, processing the received trace data, and providing the trace data to one or more other destinations for offloading or outputting the trace data from the IC.

In accordance with the inventive arrangements described herein, the HSDP trace circuit alleviates the need to store trace data in on-chip memory of the IC. Rather, the trace data may be processed efficiently by the HSDP trace circuit and offloaded from the IC to a separate and external system that is separate and distinct from the IC. The ability to offload trace data from the IC as facilitated by the HSDP trace circuit provides near limitless storage for trace data as the amount of memory available external to the IC may significantly exceed the available memory within the IC.

As discussed, the HSDP trace circuit is capable of receiving a plurality of different streams of trace data from the plurality of different types of compute circuits. Whereas other trace data collection and/or offload techniques typically employ a strategy in which different (e.g., separate and distinct) circuits are used for handling trace data originating from each different type of compute circuit, the inventive arrangements disclosed herein are capable of using a single architecture, e.g., the HSDP trace circuit, to handle multiple different streams of trace data originating from multiple different types of compute circuits. This approach does not over utilize or monopolize on-chip memory (e.g., an on-chip random access memory (RAM) such as a Double Data Rate (DDR) Synchronous Dynamic RAM) for trace data storage. Further, in cases where the HSDP trace circuit is implemented using programmable circuitry, a larger number of programmable logic resources of the IC remain available for use by user circuit designs since there is no need to implement a different trace data collection circuit for each different type of compute circuit within the IC.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example system 100. System 100 is capable of implementing trace data offload for an IC as shown. In the example, system 100 includes an IC 110 coupled to an external device 150. External device 150 is separate and distinct from IC 110.

IC 110 includes a plurality of compute circuits of different types illustrated as compute circuits 120-1 through 120-N. Compute circuits 120 are capable of conveying trace data as a plurality of streams to a high-speed debug port (HSDP) trace circuit 130. HSDP trace circuit 130 is capable of processing the trace data as received over the multiple different streams and providing the processed trace data as a single stream or output to a debug packet controller (DPC) 140. DPC 140 is capable of packetizing the received debug trace data into debug trace packets (DTPs). DPC 140 conveys the DTPs over a communication link 160 to external device 150.

In one or more aspects, communication link 160 may be implemented as a high-speed serial communication link. An example of a high-speed serial interface is the Aurora 64B/66B interface (Aurora interface) available from Advanced Micro Devices, Inc. of Santa Clara, California. The Aurora interface is capable of providing high-speed serial communication. For example, communication link 160 may provide data transfer speeds of multiple gigabits per second. It should be appreciated the Aurora 64B/66B interface is used for purposes of illustration and not limitation. Other high-speed communication links may be used.

Figure 15:
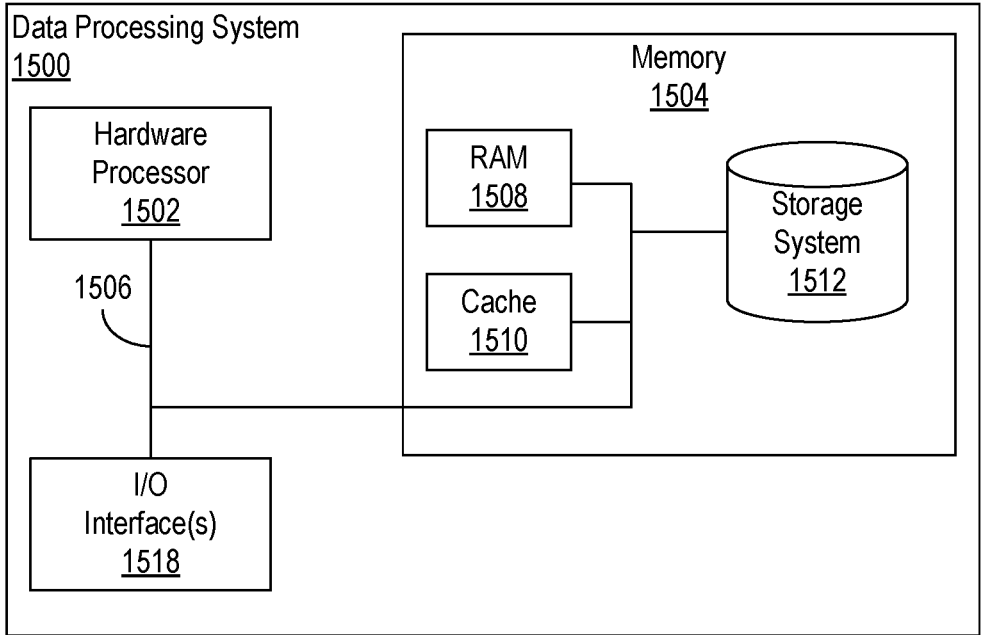
FIG. 15 illustrates an example implementation of a data processing system.

External device 150 is capable of storing trace data received in the form of the DTPs. In one or more examples, external device 150 is implemented as a computer system. In another example, external device 150 is implemented as a data storage system having internal memory for storing traced data. An example of a computer system that may be used as external device 150 or that may communicate with external device 150 to read trace data therefrom is illustrated in the example of FIG. 15.

Continuing with the example of FIG. 1, HSDP trace circuit 130 is capable of receiving a plurality of different streams from one or more compute circuits 120-1 through 120-N. In one aspect, HSDP trace circuit 130 may receive a single stream from a collection of compute circuits 120. Compute circuits 120-1 may be a first type of compute circuit while compute circuits 120-N are a different, e.g., second, type of compute circuit. Within this disclosure, the type of a compute circuit means the particular circuit subsystem of IC 110 in which the compute circuit is implemented.

In the example, the streams may be implemented as Advanced Microcontroller Bus Architecture (AMBA) extensible Interface (AXI) (hereafter "AXI") compatible streams. AXI defines an embedded microcontroller bus interface for use in establishing on-chip connections between compliant circuit blocks and/or systems. Throughout this disclosure, the AXI protocol and communication bus is referenced. It should be appreciated that AXI is provided as an illustrative example of a bus interface and is not intended as a limitation of the examples described within this disclosure. Other similar and/or equivalent protocols, communication buses, bus interfaces, and/or interconnects may be used in lieu of AXI and that the various example circuit blocks and/or signals provided within this disclosure will vary based on the particular protocol, communication bus, bus interface, and/or interconnect that is used.

Figure 2:
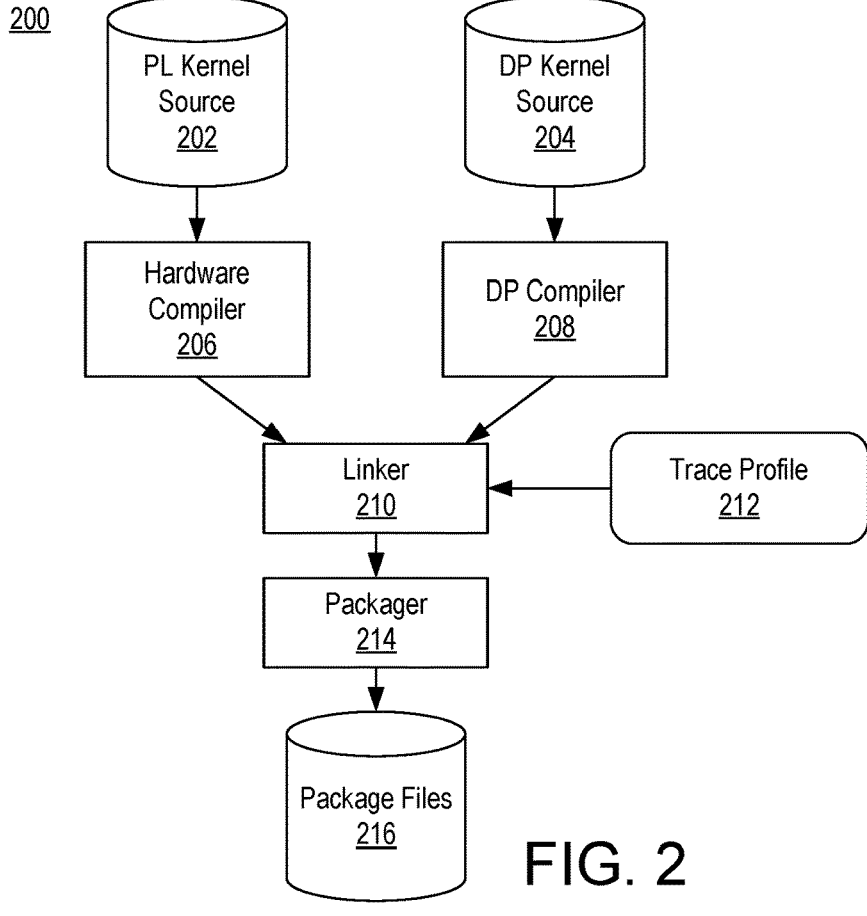
FIG. 2 illustrates an example design flow for implementing a design in an IC that supports offloading of trace data from the IC.

FIG. 2 illustrates an example design flow 200 for implementing a design in an IC such as IC 110 of FIG. 1 that supports a plurality of different types of compute circuits. For purposes of illustration, one type of the compute circuits 120 of IC 110 is programmable logic. Another type of the compute circuits 120 of IC 110 is a data processing (DP) array.

As shown, source code specifying one or more programmable logic kernels (e.g., PL kernel source 202) is provided to a hardware compiler 206. Hardware compiler 206 may generate placed and routed versions of the user specified PL kernels of PL kernel source 202. Source code specifying one or more data processing kernels (e.g., DP kernel source 204) is provided to DP compiler 208. DP compiler 208 may generate executable and placed versions of DP kernels of DP kernel source 204. The compiled PL kernel source 202 and the compiled DP kernel source 204 are provided to linker 210.

Linker 210 receives the compiled PL kernel source 202 and the compiled DP kernel source 204 along with a trace profile 212. In response to trace profile 212 or as specified by trace profile 212, linker 210 instruments the user's design by inserting an Intellectual Property (IP) core corresponding to HSDP trace circuit 130 and optionally other monitoring IP cores into the design and links the various user-specified and HSDP IP core components together. For example, trace profile 212, in addition to indicating that HSDP trace circuit 130 is to be included in the design, indicates that the HSDP trace circuit 130 is to receive trace data from one or more enumerated compute circuits 120, corresponding to respective ones of the user-specified kernels, in place of storing the trace data in an internal memory (e.g., an on-chip RAM such as a DDR memory) of IC 110. For example, trace profile 212 may include a directive such as: "trace memory=HSDP" indicating that the HSDP trace circuit 130 is to be included and that trace data is to be routed or provided to HSDP trace circuit 130 in lieu of an on-chip memory. Trace profile 212 may include a directive such as "dparray_trace_offload=HSDP" indicating that the trace data for a compute circuit 120 implemented in a DP array is to be provided to the inserted HSDP trace circuit 130. Trace profile 212 may also include user-specified configuration parameters used to configure HSDP trace circuit 130.

From the linked components generated by linker 210, packager 214 is capable of generating one or more binary files/images that may be loaded into IC 110 to implement the user design (e.g., PL kernel source 202 and DP kernel source 204) within IC 110 along with a trace data offload circuit architecture. Packager 214, for example, is capable of generating the files required for IC 110 to boot and run the user design including compute circuits 120 and HSDP trace circuit 130. It should be appreciated that if additional kernels implemented as different types of compute circuits are used, such other kernels may be compiled through their respective compilers and linked by linker 210.

In one or more example implementations, linker 210 is capable of generating a metadata section that may be included in packaged files 216. The metadata section may specify information such as instance names, addresses, versions, and/or other properties of IP cores included in the user design (e.g., formed of PL kernel source 202 and/or DP kernel source 204). Runtime drivers/tools are capable of reading the metadata section at runtime of the design in IC 110 to access any debug and/or trace IP instances in IC 110.

For example, an entry corresponding to the HSDP IP core may be included in the metadata section that specifies such data for the HSDP IP core. The entry may include, for example an instance name, an address, and a property field, wherein the property field indicates whether different input types are present (e.g., whether 1, 2, or more different compute circuit types are included in the user's design). At runtime, this entry is used by a processor tasked with configuring aspects of the design as implemented in IC 110 to configure DPC 140 with the address (e.g., IP address) of HSDP trace circuit 130.

In another aspect, the property field is used to determine whether the trace packets will have a type of information field. The property field, being formed of one or more bits in the metadata entry for the HSDP IP core, may be set to a particular value at link time. In one or more example implementations, the particular value indicates whether the HSDP IP core is connected to a single type of trace origin (e.g., a single type of compute circuit) or multiple different types of trace origin (e.g., multiple different types of compute circuits). At runtime, software executed by external device 150 may use this property field for configuring various components. For example, if the bit(s) in the property field indicate multiple different trace streams, then external device 150 will expect type-info to be present in received DTPs and process the DTPs accordingly. For purposes of illustration, the property field may specify that the compute circuits are DP array only, programmable logic only, both DP array and programmable logic, and/or include compute circuit(s) of other circuit subsystems of IC 110. Still, as noted, other types may be supported depending on the particular architecture of IC 110 and the various circuit subsystems of compute circuitry included therein.

Figure 3:
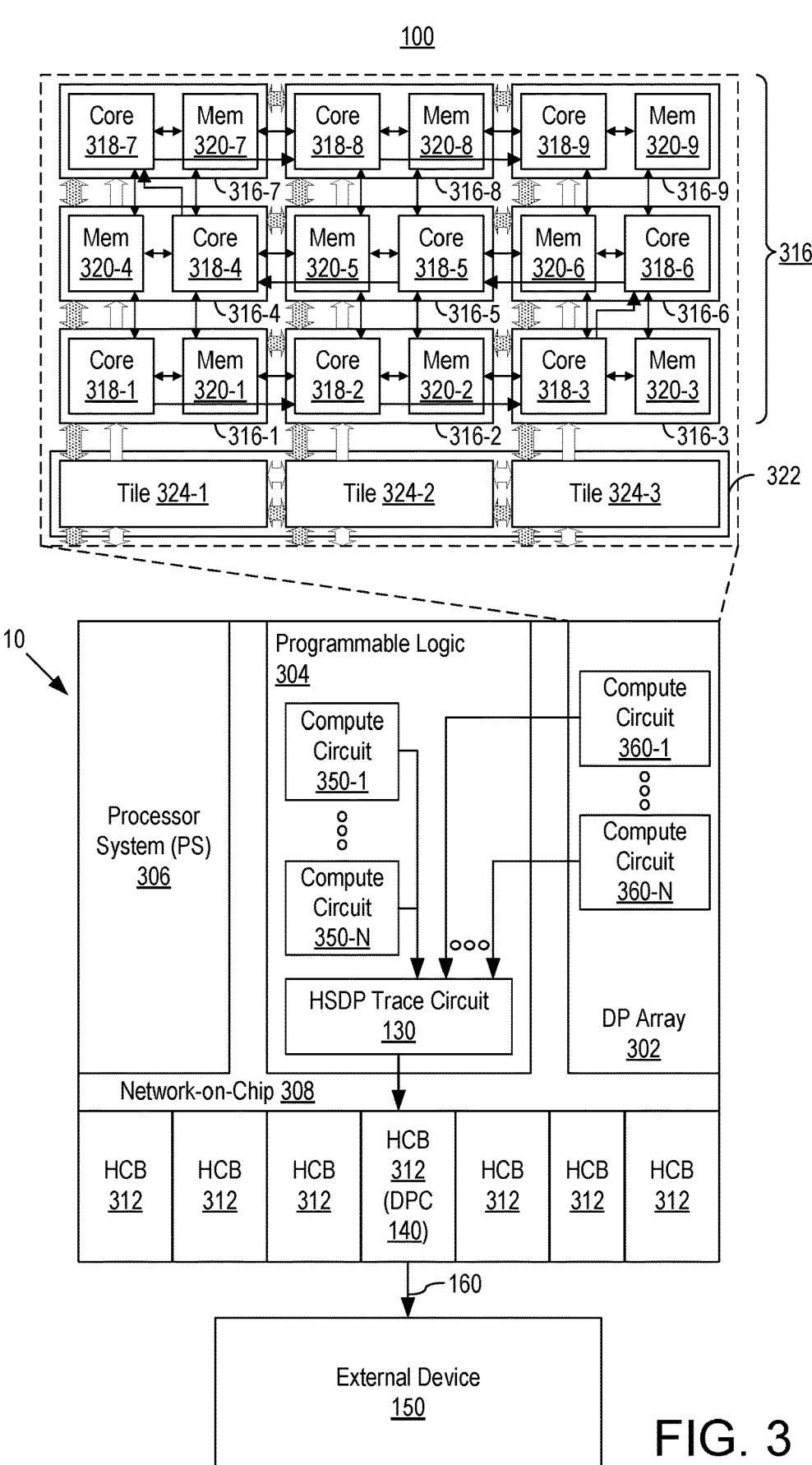
FIG. 3 illustrates another example implementation of the system of FIG. 1.

FIG. 3 illustrates another example implementation of system 100 of FIG. 1. In the example of FIG. 3, the architecture of IC 110 is illustrated in greater detail. IC 110 is an example of an adaptive IC. IC 110 is also an example of a programmable IC. IC 110 is also illustrative of a System-on-Chip (SoC). An adaptive IC is an IC that may be updated subsequent to deployment of the device into the field. An adaptive IC may be optimized, e.g., configured or reconfigured, for performing particular operations after deployment. The optimization may be performed repeatedly over time to meet different requirements or needs. A programmable IC includes any IC that includes at least some programmable circuitry. Examples of programmable circuitry include programmable logic and/or FPGA circuitry.

In the example of FIG. 3, IC 110 is implemented on a single die provided within a single integrated package. In other examples, IC 110 may be implemented using a plurality of interconnected dies where the various programmable circuit resources illustrated in FIG. 3 are implemented across the different interconnected dies.

In the example, IC 110 includes DP array 302, programmable logic 304, a processor system 306, a Network-on-Chip (NoC) 308, and one or more hardwired circuit blocks (HCBs) 312. It should be appreciated that the architecture of IC 110 is provided for purposes of illustration and not limitation. An IC for use with the inventive arrangements described herein may include any of a variety of combinations of the subsystems described herein implementing various types of compute circuits 120. For example, an IC may include one or more processors; one or more processors (e.g., processor system 306) in combination with programmable logic 304; one or more processors (e.g., processor system 306) in combination with a processor array such as DP array 302; programmable logic 304 in combination with DP array 302; or any combination thereof. For purposes of discussion, each of DP array 302, programmable logic 304, processor system 306, and/or each HCB 312 may be considered a different circuit subsystem of IC 110 capable of implementing compute circuits of that particular type.

For purposes of illustration and not limitation, compute circuit 120-1 may be implemented in DP array 302. A second and different compute circuit, e.g., compute circuit 120-N may be implemented in programmable logic 304. As illustrated and described in greater detail below, each of the compute circuits 120 may implement a user-specified kernel (e.g., user-specified function).

DP array 302 is implemented as a plurality of interconnected and programmable compute tiles 316. The term "tile," as used herein in connection with an IC, means a circuit block. Compute tiles 316 may be arranged in an array and are hardwired. Each compute tile 316 can include one or more cores 318 and a memory circuit (abbreviated "Mem" in FIG. 3) 320. In one aspect, each core 318 is capable of executing program code stored in a core-specific program memory contained within each respective core (not shown).

In one aspect, each core 318 may be implemented as a vector processor. For example, cores 318 may be implemented as Very Long Instruction Word (VLIW) processors with Single Instruction Multiple Data (SIMD) vector units. Cores 318 may be highly optimized for compute intensive applications. In other arrangements, cores 318 may be implemented as application-specific circuits capable of performing any of a variety of different tasks.

In one or more examples, each core 318 is capable of directly accessing the memory circuit 320 within the same compute tile 316 and the memory circuit 320 of any other compute tile 316 that is adjacent to the core 318 of the compute tile 316 in the up, down, left, and/or right directions. For example, core 318-5 is capable of directly reading and/or writing (e.g., via respective memory interfaces not shown) memory circuits 320-5, 320-8, 320-6, and 320-2. Core 318-5 sees each of memory circuits 320-5, 320-8, 320-6, and 320-2 as a unified region of memory (e.g., as a part of the local memory accessible to core 318-5). This facilitates data sharing among different compute tiles 316 in DP array 302. In other examples, core 318-5 may be directly connected to memory circuits 320 in other compute tiles.

Compute tiles 316 are interconnected by programmable interconnect circuitry. The programmable interconnect circuitry may include one or more different and independent networks. For example, the programmable interconnect circuitry may include a streaming network formed of streaming connections (shaded arrows) and a memory-mapped network formed of memory-mapped connections (unshaded arrows).

Cores 318 may be directly connected with adjacent cores 318 via core-to-core cascade connections. In one aspect, core-to-core cascade connections are unidirectional and direct connections between cores 318 as pictured. In another aspect, core-to-core cascade connections are bidirectional and direct connections between cores 318. In general, core-to-core cascade connections generally allow the results stored in an accumulation register of a source core 318 to be provided directly to an input of a target or load core 318 without traversing the programmable interconnects and/or being written by a first core 318 to a memory circuit 320 to be read by a different core 318.

In an example implementation, compute tiles 316 do not include cache memories. By omitting cache memories, DP array 302 is capable of achieving predictable, e.g., deterministic, performance. Further, significant processing overhead is avoided since maintaining coherency among cache memories located in different compute tiles 316 is not required. In a further example, cores 318 do not have input interrupts. Thus, cores 318 are capable of operating uninterrupted. Omitting input interrupts to cores 318 also allows DP array 302 to achieve predictable, e.g., deterministic, performance.

Interface block 322 operates as an interface that connects compute tiles 316 to other resources of IC 110. In the example of FIG. 3, interface block 322 includes a plurality of interconnected interface tiles 324 organized in a row. Interface tiles 324 are connected so that data may be propagated from one interface tile to another bi-directionally. Each interface tile 324 is capable of operating as an interface for the column of compute tiles 316 directly above and is capable of interfacing such compute tiles 316 with components and/or subsystems of IC 110 including, but not limited to, programmable logic 304 and/or NoC 308.

In one or more other example implementations, DP array 302 may include memory tiles (not shown). The memory tiles may be interspersed with the compute tiles 316 illustrated. Inclusion of memory tiles within DP array 302 allows DP array 302 to store a larger amount of data locally within DP array 302 without having to access other memories, which would introduce latency into the system. Memory tiles are characterized by the lack of a core and the inclusion of a memory of generally higher capacity than memory circuits 320.

Programmable logic 304 is circuitry that may be programmed to perform specified functions. As an example, programmable logic 304 may be implemented as field-programmable gate array type of circuitry. Programmable logic 304 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of programmable logic is highly configurable unlike hardwired circuitry. Each programmable circuit block of programmable logic 304 typically includes a programmable element (e.g., a functional element) and a programmable interconnect. The programmable interconnects provide the highly configurable topology of programmable logic 304. The programmable interconnects may be configured on a per wire basis to provide connectivity among the programmable elements of programmable circuit blocks of programmable logic 304 and is configurable on a per-bit basis (e.g., where each wire conveys a single bit of information) unlike connectivity among compute tiles 316, for example, that may include multi-bit stream connections capable of supporting packet-based communications.

Processor system 306 is implemented as hardwired circuitry that is fabricated as part of IC 110. Processor system 306 may be implemented as, or include, any of a variety of different processor types each capable of executing program code. For example, processor system 306 may be implemented as one or more processors such as an application processor and/or a real-time processor. Each processor may include one or more cores. Each processor and/or core is capable of executing program code. In still another example, processor system 306 may include one or more processors, cores, modules, co-processors, I/O interfaces, and/or other resources. Processor system 306 may be implemented using any of a variety of different types of architectures. Example architectures that may be used to implement processors and/or cores of processor system 306 may include, but are not limited to, a CISC architecture, a RISC architecture, a vector processing architecture, or other known architecture. Example processors include, but are not limited to, processors having an x86 type of architecture (IA-32, IA-64, etc.), Power Architecture, ARM processors, and the like.

In one or more example implementations, processor system 306 may execute a control program or application that controls operation of one or more kernels of a user design implemented as compute circuits within DP array 302. In other arrangements, a processor disposed in a host data processing system (e.g., hardware processor 1502 of FIG. 15) coupled to IC 110 may control execution of the one or more kernels of a user design implemented as compute circuits within DP array 302. In still other examples, IC 110 may include another controller that is dedicated to controlling operation of one or more kernels of a user design implemented as compute circuits within DP array 302.

NoC 308 is a programmable interconnecting network for sharing data between endpoint circuits in IC 110. The endpoint circuits can be disposed in DP array 302, programmable logic 304, processor system 306, and/or selected HCBs 312. NoC 308 can include high-speed data paths with dedicated switching. In an example, NoC 308 includes one or more horizontal paths, one or more vertical paths, or both horizontal and vertical path(s). The arrangement and number of regions shown in FIG. 3 is merely an example. NoC 308 is an example of the common infrastructure that is available within IC 110 to connect selected components and/or subsystems.

Within NoC 308, the nets that are to be routed through NoC 308 are unknown until a user circuit design is created for implementation within IC 110. NoC 308 may be programmed by loading configuration data into internal configuration registers that define how elements within NoC 308 such as switches and interfaces are configured and operate to pass data from switch to switch and among the NoC interfaces to connect the endpoint circuits. NoC 308 is fabricated as part of IC 110 (e.g., is hardwired) and, while not physically modifiable, may be programmed to establish connectivity between different principal circuits and different agent circuits of a user circuit design. NoC 308, upon power-on, does not implement any application data paths or routes therein, but may provide default paths for loading configuration data into selected other subsystems. Once configured, however, NoC 308 implements data paths or routes between endpoint circuits.

HCBs 312 include special-purpose circuit blocks fabricated as part of IC 110. Though hardwired, HCBs 312 may be configured by loading configuration data into control registers to implement one or more different modes of operation. Examples of HCBs 312 may include input/output (I/O) blocks, transceivers for sending and receiving signals to circuits and/or systems external to IC 110, memory controllers, or the like. Examples of different I/O blocks may include single-ended and pseudo differential I/Os. Examples of transceivers may include high-speed differentially clocked transceivers. Other examples of HCBs 312 include, but are not limited to, cryptographic engines, digital-to-analog converters (DACs), analog-to-digital converters (ADCs), and the like. In general, HCBs 312 are application-specific circuit blocks.

In one or more other examples, HCBs 312 may include a RAM, e.g., one or more banks of RAM. As an example, the RAM may be a DDR RAM. In still another example, HCBs 312 may include a High-Bandwidth Memory (HBM). For purposes of illustration, one of HCBs 312 may implement the DPC 140 of FIG. 1.

The various programmable circuit resources illustrated in FIG. 3 may be programmed initially as part of a boot process for IC 110. During runtime, the programmable circuit resources may be reconfigured. At any point during runtime, all or a portion of IC 110 may be reconfigured. In some cases, processor system 306 or another processing system disposed in IC 110 may configure and/or reconfigure programmable logic 304 and/or NoC 308.

In the example of FIG. 3, a plurality of compute circuits 350 are illustrated as being implemented in programmable logic 304. Each of compute circuits 350 represents a user-specified circuit implemented in programmable logic 304 and an example of a compute circuit 120. The particular number of compute circuits 350 shown is not intended as a limitation of the inventive arrangements. For example, a single compute circuit 350 can be used or more compute circuits 350 than shown may be used.

A plurality of compute circuits 360 are illustrated as being implemented in DP array 302. Each of compute circuits 360 represents a user-specified function implemented in one or more compute tiles 316 of DP array 302 and is an example of a compute circuit 120. The particular number of compute circuits 360 shown is not intended as a limitation of the inventive arrangements. For example, a single compute circuit 360 may be used or more compute circuits 360 than shown may be used. As discussed, the type of a given compute circuit refers to the underlying circuit subsystem in which that compute circuit is implemented. Each circuit subsystem has a different underlying circuit architecture. For example, compute circuits 350 represent one type of compute circuit while compute circuits 360 represent another, different type of compute circuit.

DP array 302 and programmable logic 304 can be instrumented with monitor and/or debug circuitry to generate trace data (e.g., hardware trace data) that may be used to observe the operation of a user design. In the example of FIG. 3, trace data may be conveyed from compute circuits 350 to HSDP trace circuit 130. In the example, the trace data from compute circuits 350 may be combined or coalesced into a single stream of trace data. Multiple streams of trace data may be received from DP array 302. In the example, each stream of trace data from DP array 302 may be received by HSDP trace circuit 130 as an individual stream.

Within this disclosure, the trace data may be hardware trace data in that the trace data may be obtained from circuitry that may or may not execute program code. That is, the trace data may be "hardware" trace data in that the trace data may convey various data values generated by a given compute circuit and need not include instruction or program counter trace data. Still, in cases where a compute circuit is implemented as program code and executes on a core 318 and/or a processor of processor system 306, the trace data may include instruction and/or program counter trace data.

In the example of FIG. 3, HSDP trace circuit 130 is capable of receiving trace data in the form of a plurality of different streams from the different types of compute circuits illustrated. Because HSDP trace circuit 130 is implemented in programmable logic 304, HSDP trace circuit 130 may be customized or configured according to the particular needs of the user's circuit design. As an illustrative example, HSDP trace circuit 130 can be configured to receive stream(s) of trace data from DP array 302 only, a stream of trace data from programmable logic 304 only, or streams of trace data from both DP array 302 and programmable logic 304. In other examples, HSDP trace circuit 130 may receive streams of trace data from one or more other compute circuits of one or more different types. Regardless of the particular scenario in which trace data is to be collected, only a single instance of HSDP trace circuit 130 is needed. That is, separate trace circuits for receiving trace data from DP array 302 and programmable logic 304 are not required.

Figure 4A:
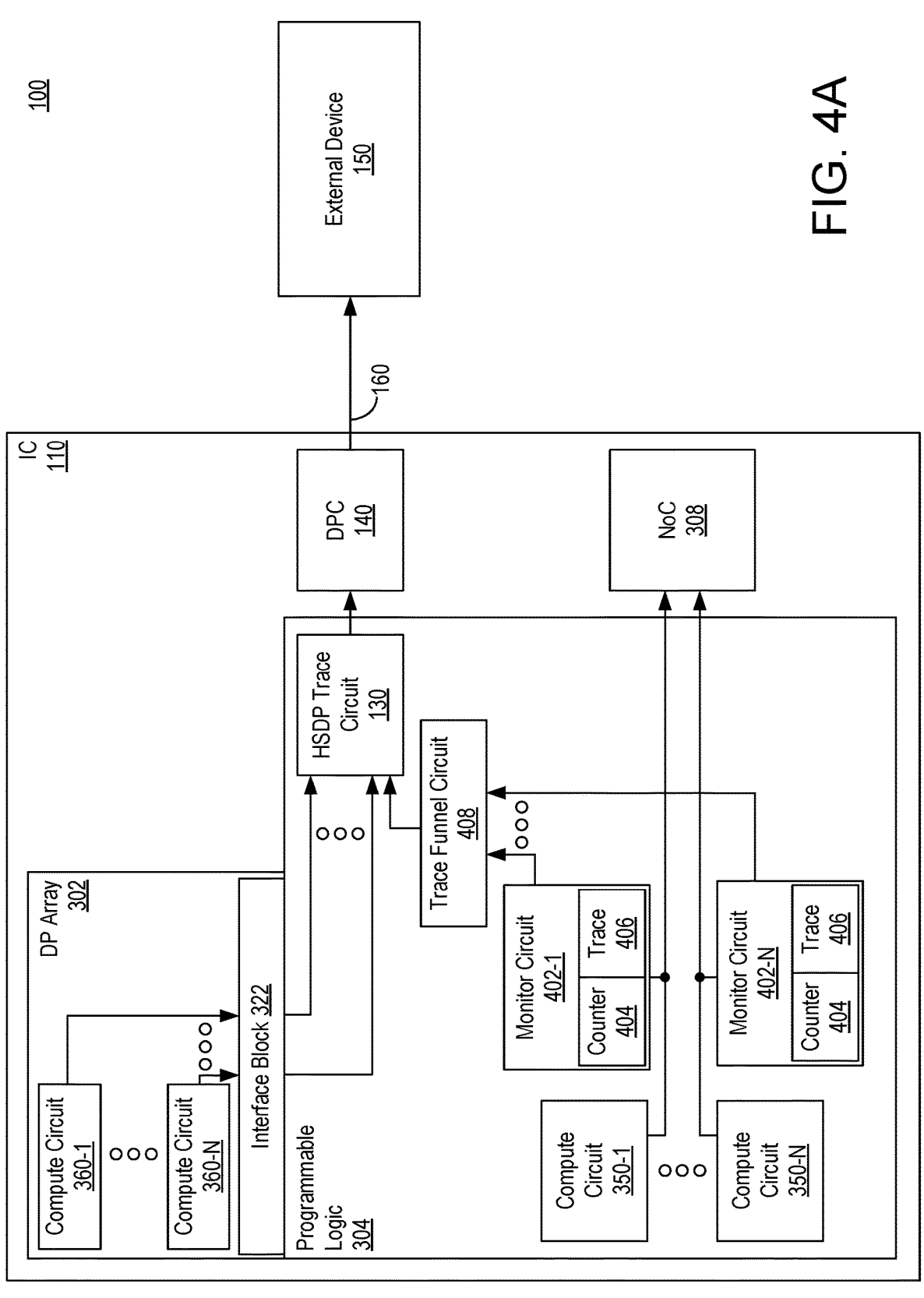
FIGS. 4A, 4B, and 4C illustrate example implementations of the system of FIG. 1.
Figure 4B:
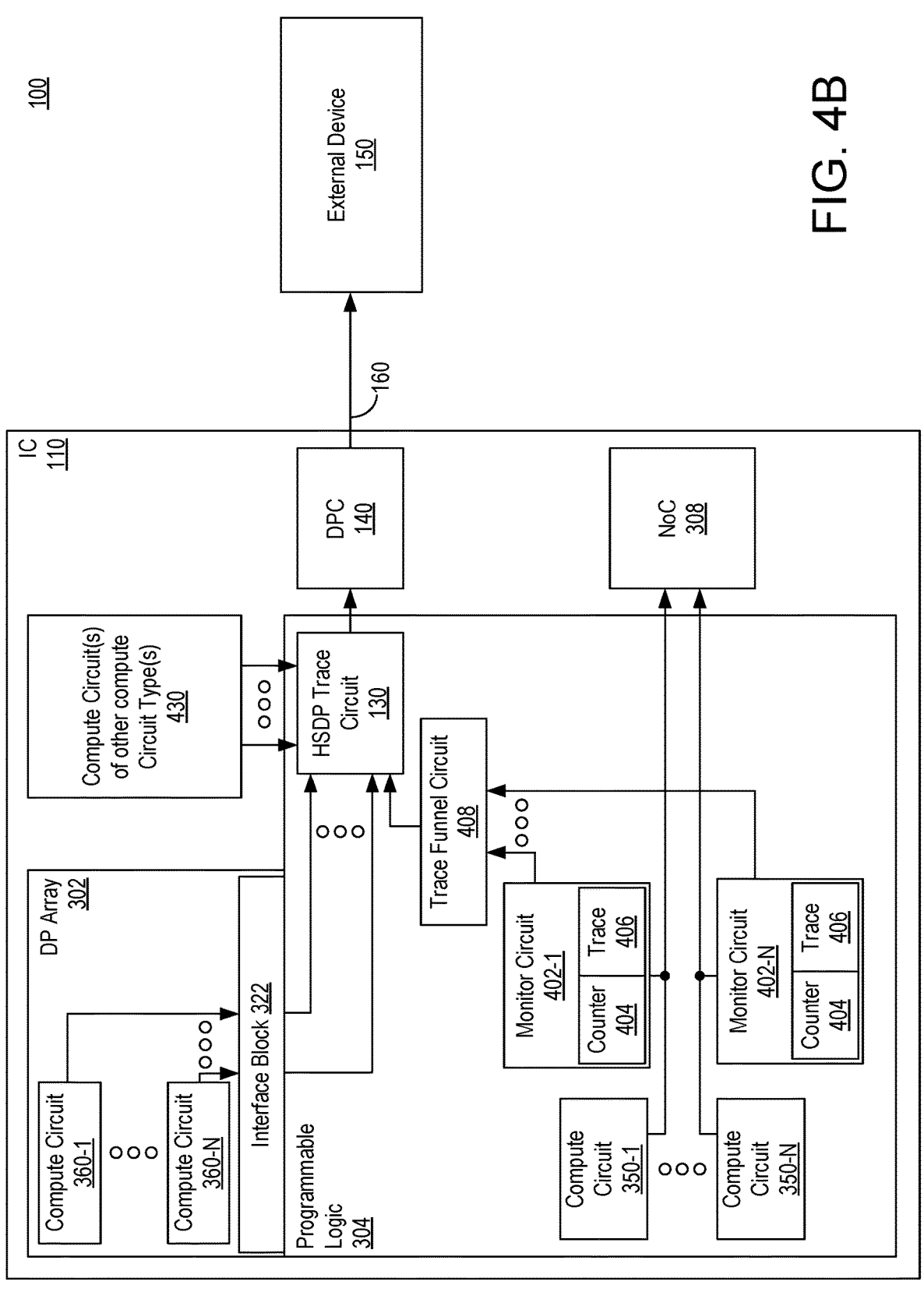
Figure 4C:
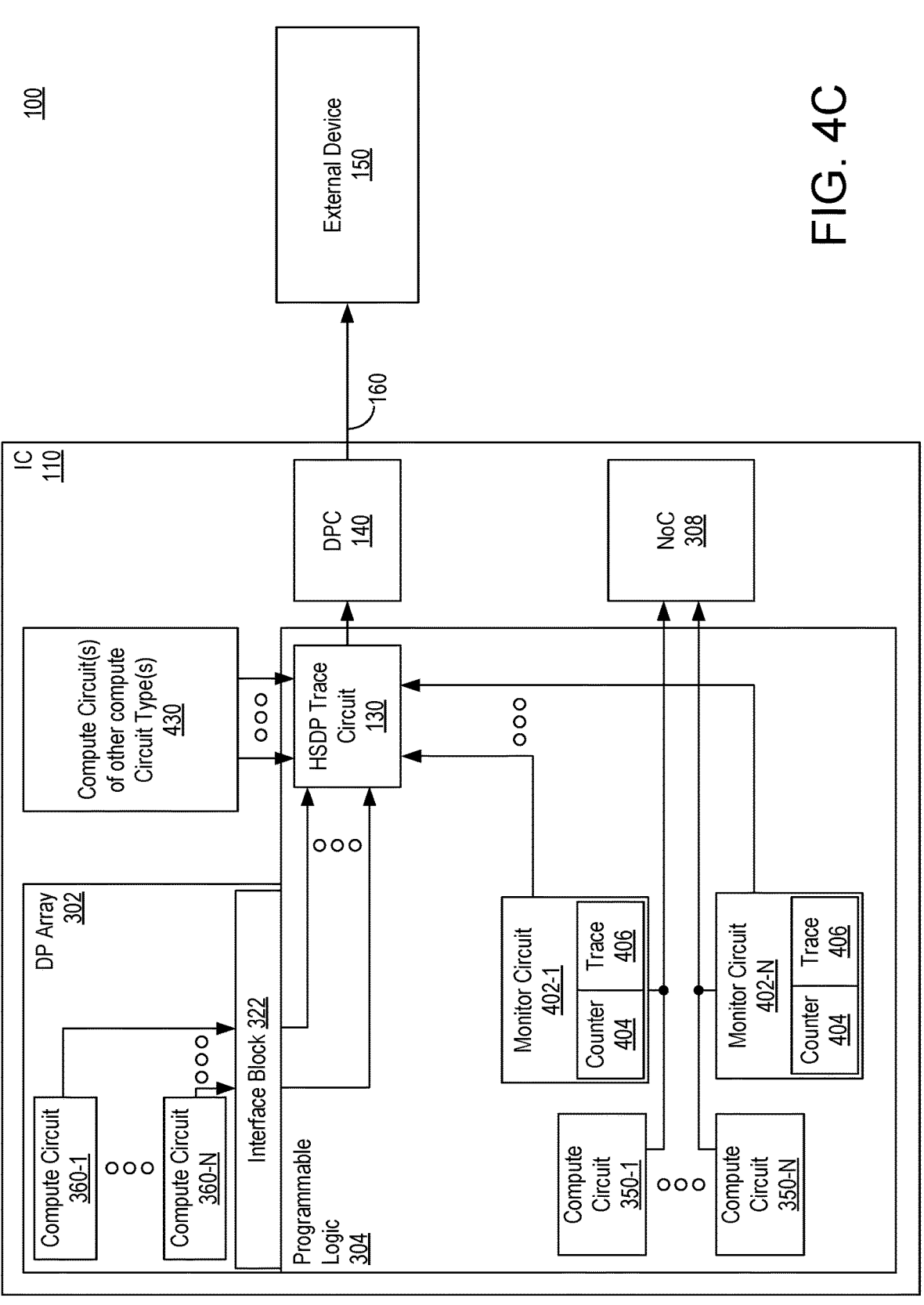

FIGS. 4A, 4B, and 4C illustrate example implementations of system 100. In the example of FIG. 4A, streams of trace data from a plurality of compute circuits 360 may be directly connected to stream inputs (e.g., AXI stream inputs) of HSDP trace circuit 130. Monitor circuits 402 have been inserted into the user design and implemented in programmable logic 304. Each monitor circuit 402 may include a counter 404 and trace circuitry 406. Monitor circuits 402 may be added to AXI buses and/or connections to compute circuits 350 to generate trace data that may be output from each respective monitor circuit 402 as a stream to a trace funnel circuit 408. Trace funnel circuit 408 is capable of combining the received trace data from each respective monitor circuit 402 and outputting a single stream including the trace data from each of monitor circuits 402 (e.g., interspersed) to a stream input (e.g., an AXI stream input) of HSDP trace circuit 130.

For purposes of illustration, HSDP trace circuit 130 may include 16 stream inputs that may be coupled to DP array 302. As such, HSDP trace circuit 130 is capable of receiving up to 16 streams of trace data from DP array 302. HSDP trace circuit 130 may include one (e.g., additional) stream input that couples to trace funnel circuit 408. As such, HSDP trace circuit 130 is capable of receiving one stream of trace data from programmable logic 304. Appreciably, in view of trace funnel circuit 408, the single stream may include trace data from a plurality of different compute circuits 350. It should be appreciated that the particular number of stream inputs for the different types of compute circuits are provided for purposes of illustration only. Different numbers of input ports may be included than described. For example, fewer or more than 16 stream inputs for DP array 302 may be included and more than one stream input for programmable logic 304 may be included.

In one or more example implementations, the stream inputs of HSDP trace circuit 130 are implemented as agent interfaces, where the DP array 302 and trace funnel circuit 408 operate as principals. In this regard, the agent circuitry operates under control or responsive to the principal circuit. HSDP trace circuit 130 may include a single output (e.g., an AXI memory mapped output). The output of HSDP trace circuit 130 may operate as an agent interface with respect to DPC 140 coupled thereto. DPC 140 operates as a principal with respect to the output of HSDP trace circuit 130.

As discussed, because HSDP trace circuit 130 is implemented in programmable logic 304, HSDP trace circuit 130 is highly configurable. The following is a list of configuration parameters of HSDP trace circuit 130 (e.g., of the HSDP IP core) that may be set or specified by a user based on the particular design in which the HSDP trace circuit 130 is to be included.

Number of types of compute circuits from which trace data is to be received. For example, a "1" may indicate that only a single type of compute circuit will be sending trace data (e.g., either DP array 302 only or programmable logic 304 only). A "2" may indicate that both the DP array 302 and the programmable logic 304 are expected to send trace data. In this regard, the number of types of compute circuits indicates the particular types of connections being established with HSDP trace circuit 130. In other arrangements, particular values may indicate particular combinations of compute circuit types sending trace data, e.g., where there may be more than 2 and/or different compute circuit type combinations used.

The number of inputs for each type of compute circuit. For example, the number of streams for DP array 302 may be set to a value from 1-16. The number of streams from programmable logic 304 may be set to 1. The number of stream inputs of HSDP trace circuit 130 devoted to each particular type of compute circuit may be set based on these parameters and implemented during the flow illustrated in FIG. 2.

The size of packets of trace data to be received.

The data width of the streams of trace data.

A depth of a first-in-first-out (FIFO) memory instantiated on each stream input of HSDP trace circuit 130.

By appropriately configuring HSDP trace circuit 130, resources of programmable logic 304 may be conserved when not needed thereby making such resources available for the user design. That is, HSDP trace circuit 130 is implemented to accommodate only the number of streams, FIFO depths, and data widths indicated by the configuration parameters above. This allows for smaller implementations when not all of the foregoing features (e.g., fewer than the maximum number of input streams supported) are required.

HSDP trace circuit 130 is capable of arbitrating among the plurality of streams of trace data received to generate a single output of trace data (e.g., a single output stream of trace data) to DPC 140. DPC 140 is capable of packetizing the received trace data to generate DTPs that may be conveyed over communication link 160 to external device 150. The arbitration scheme is described in greater detail hereinbelow.

In one aspect, HSDP trace circuit 130 is capable of adding a compute circuit type identifier to received trace data. That is, for each packet of trace data received on a received stream, HSDP trace circuit 130 is capable of adding a compute circuit type identifier to that trace data. The compute circuit type identifier indicates the type of compute circuit (e.g., the circuit subsystem of IC 110) from which the trace data originated. This insertion operation need only be performed in cases where there is more than one compute circuit type connected to HSDP trace circuit 130.

As an illustrative example, each packet of trace data received from DP array 302 (e.g., a compute circuit 120 such as a compute circuit 360 implemented in DP array 302) will have a same compute circuit type identifier added thereto. Each packet of trace data received from programmable logic 304 (e.g., a compute circuit 120 such as a compute circuit 350 implemented in programmable logic 304) will have a same compute circuit type identifier added thereto. Thus, the compute circuit type identifier added to received packets of trace data by HSDP trace circuit 130 indicates the type of compute circuit that generated the trace data. In one aspect, the compute circuit type identifier may be ascertained by HSDP trace circuit 130 based on the particular stream input over which the trace data is received.

During operation of the design as loaded in IC 110, trace data generated by DP array 302 and/or programmable logic 304 is provided to HSDP trace circuit 130. In the example, DPC 140, acting as principal, is capable of periodically issuing read requests to obtain trace data (e.g., packets of trace data as generated by DP array 302 and/or monitor circuits 402). More particularly, DPC 140 is capable of polling or requesting data from HSDP trace circuit 130 as opposed to HSDP trace circuit 130 pushing data to DPC 140. That is, data cannot be pushed to DPC 140 as DPC 140 is a principal.

DPC 140 is capable of packetizing the received data as DTPs by performing operations that may include, but are not limited to, adding header data, adding information such as the number of words included in the packet, adding cyclic redundancy check (CRC) and/or other error checking data. Once DTPs are formed, DPC 140 sends the DTPs over communication link 160 to external device 150. In one aspect, DPC 140 is implemented as a hardened circuit block. In this regard, DPC 140 is configured to receive a single input of trace data from HSDP trace circuit 130. HSDP trace circuit 130, being implemented in programmable circuitry (e.g., programmable logic), may operate as a programmable interface to DPC 140 to accommodate a user-specified number of input streams.

In the examples, in cases where multiple different compute circuit types are used, additional header data such as the number of words in a packet is added as the compute circuits of different compute circuit types may generate trace data of different sizes. Such data, e.g., the number of words in a packet, is not added or necessary in cases where only a single type of compute circuit is used as the trace data will be of consistent size. This simplifies data extraction performed later.

Before running the user design generated using the process illustrated in FIG. 2 in a target IC, e.g., IC 110, DPC 140 must be configured with the address of the HSDP IP core as linked with the design. In one aspect, runtime script(s) that are generated as part of the compilation process may be executed by a processor, whether disposed in external device 150, within IC 110, or in another system (e.g., a host system). In executing the runtime script(s), the processor is capable of retrieving the address of HSDP trace circuit 130 from the binary image and configuring DPC 140 with the address of HSDP trace circuit 130 (e.g., the address from which to read trace data). Further, if trace functions are activated in certain compute circuits (e.g., DP array 302 as described in connection with FIG. 3), runtime configuration parameters for such compute circuits may be set by the processor within the various compute circuits of IC 110.

In one or more example implementations, HSDP trace circuit 130 adds the compute circuit type identifier to received trace data only when configured to do so at link time. That is, at link time, all of the input connections for HSDP trace circuit 130 are implemented and HSDP trace circuit 130 is appropriately configured. Accordingly, during operation, HSDP trace circuit 130 adds type identifiers to received trace data only in cases where HSDP trace circuit 130 was configured at link time to receive trace data from multiple different types of compute circuits. In cases where HSDP trace circuit 130 was configured at link time to receive trace data from only a single type of compute circuit, HSDP trace circuit 130 does not add a compute circuit type identifier to the received trace data.

In addition or in the alternative, in cases where HSDP trace circuit 130 is configured during linking to receive trace data from more than one different type of compute circuit, a user is permitted to enable only a single compute circuit type for runtime, e.g., when HSDP trace circuit 130 executes. HSDP trace circuit 130 will receive trace data only for the enabled input. In that case, HSDP trace circuit 130 still adds compute circuit identifiers to the received trace data. Other components in the architecture operate with the expectation that trace data is received from multiple different types of compute circuits and that DTPs will include compute circuit type identifiers. The DTPs, in this example, may include only compute circuit type identifiers of a same type.

FIG. 4B illustrates another example of system 100 that is substantially similar to the example of FIG. 4A. In the example of FIG. 4B, one or more additional compute circuits 430 of one or more different compute circuit types are illustrated. As shown, HSDP trace circuit 130 may include additional stream inputs to receive streams of trace data from such other compute circuits 430. Compute circuits 430 may be functions executed by a processor system (e.g., one or more processors) in IC 110, implemented in hardwired circuit blocks of IC 110, or implemented using other systems of IC 110. HSDP trace circuit 130 may operate as described by inserting appropriate compute type identifiers on the respective streams of trace data received.

FIG. 4C illustrates another example of system 100 that is substantially similar to the examples of FIGS. 4A and 4B. In the example of FIG. 4C, trace funnel circuit 408 is omitted. In that case, HSDP trace circuit 130 may include additional stream inputs to receive one or more streams of trace data from different monitor circuits 402 implemented in programmable logic 304.

Figure 5:
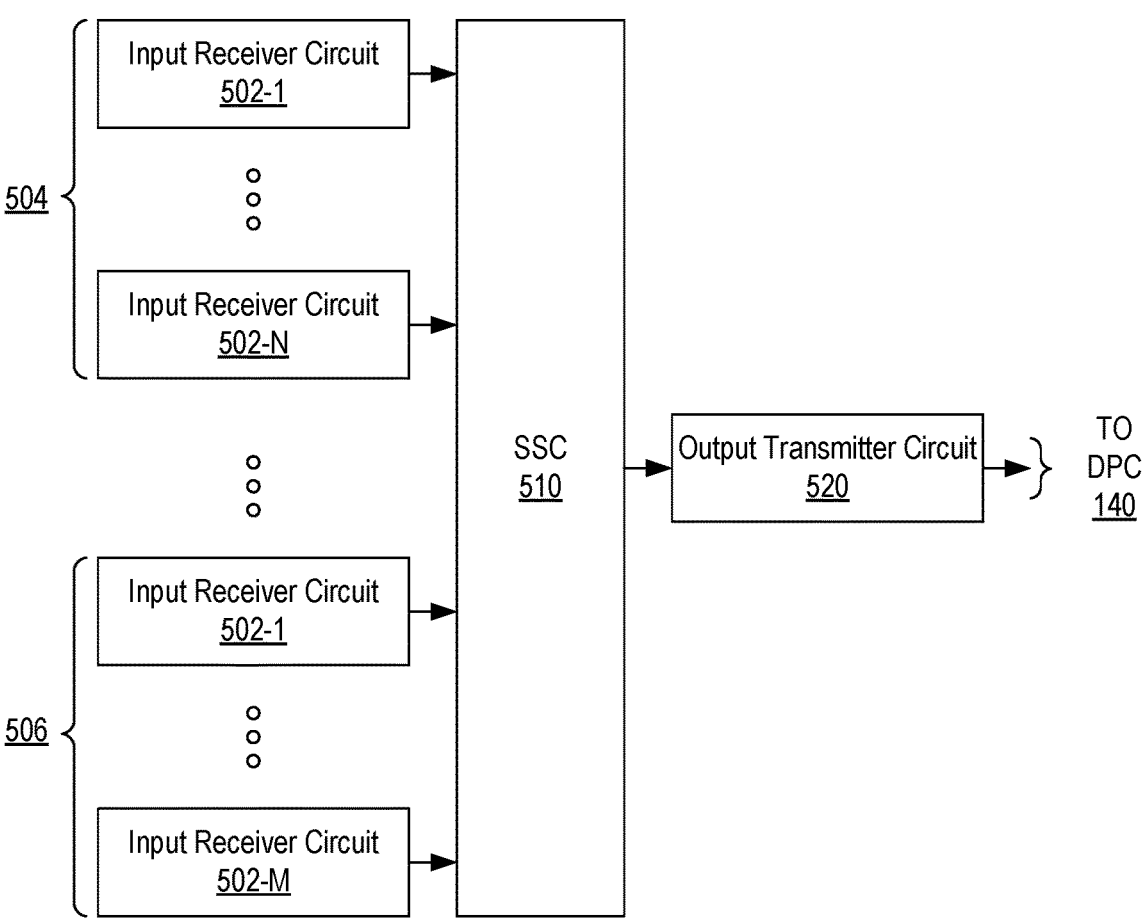
FIG. 5 illustrates an example implementation of the high-speed debug port (HSDP) trace circuit of FIG. 1.

FIG. 5 illustrates an example implementation of HSDP trace circuit 130. FIG. 5 illustrates an example implementation of HSDP trace circuit 130 that may be used with any of the various examples illustrated in FIGS. 4A, 4B, and/or 4C. In the example of FIG. 5, HSDP trace circuit 130 includes a plurality of input receiver circuits 502, a stream selector circuit (SSC) 510, and an output transmitter circuit 520.

Each input receiver circuit 502 is capable of operating as an agent of the particular compute circuit providing trace data thereto. In the example, input receiver circuits 502 of HSDP trace circuit 130 are organized into one or more sets, where each set includes one or more constituent input receiver circuits 502. Each set of input receiver circuits 502 is reserved for use by, e.g., connected to, compute circuits of a same and particular type. For example, set 504 may be connected to DP array 302. Set 506 may be connected to programmable logic 304. Appreciably, in this example, set 506 may include a single input receiver circuit 502 when implementing the architecture of FIGS. 4A and/or 4B. Set 506 may include a plurality of input receiver circuits 502, e.g., up to "M" input receiver circuits 502, when implementing the architecture of FIG. 4C. One or more additional sets (not shown) each having one or more input receiver circuits 502 may be connected to compute circuits of other type(s) such as compute circuits 430. In any case, for each stream of trace data originating from a given compute circuit type, HSDP trace circuit 130 will have a dedicated input receiver circuit 502 dedicated to receiving that stream.

SSC 510 is capable of arbitrating among the different streams of trace data received via input receiver circuits 502. In one example, SSC 510 may include multiple different stages of arbitration, where each stage of arbitration may include one or more different levels of arbitration. In general, the first stage of arbitration involves arbitrating among streams of trace data of same compute circuit type. For example, SSC 510 may perform a first stage arbitration in which SSC 510 selects a particular stream of trace data from among the input receiver circuits 502 of set 504. Concurrently and/or in parallel as part of the first level arbitration, SSC 510 may select a particular stream of trace data from among the input receiver circuits 502 of set 506, etc.

SSC 510 may perform a second stage of arbitration that selects a particular stream of trace data to pass (e.g., a packet or packets thereof) from among each of the arbitration winners (e.g., selected streams) from the first stage of arbitration. As such, the first stage of arbitration is capable of performing multiple arbitrations to select a stream of trace data for each different type of compute circuit. The second stage of arbitration is among streams of trace data originating from different compute circuit types.

In one or more example implementations, SSC 510 is responsible for performing one or more processing operations on the received streams of trace data. For example, SSC 510 is capable of inserting the compute circuit type identifiers within the respective packages of trace data received.

Output transmitter circuit 520 is coupled to DPC 140. Output transmitter circuit receives the results from the second arbitration, which may be read by DPC 140. Output transmitter circuit 520 is configured to operate as an agent of DPC 140.

Figure 6:
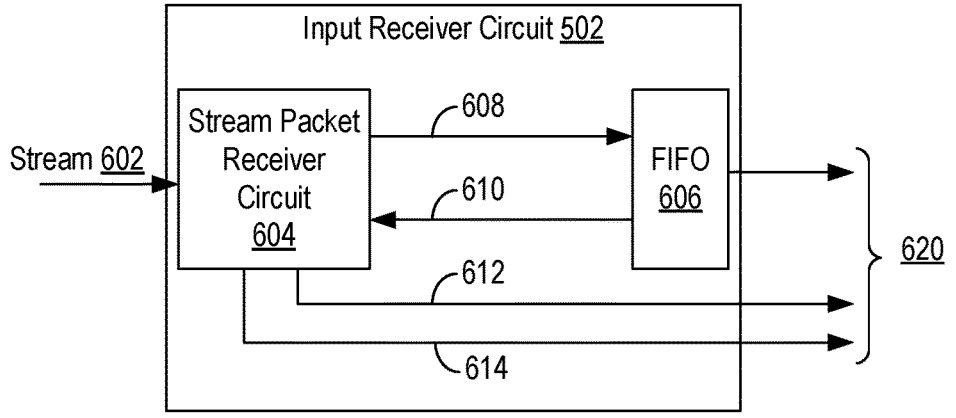
FIG. 6 illustrates an example implementation of an input receiver circuit of FIG. 5.

FIG. 6 illustrates an example implementation of input receiver circuit 502 of FIG. 5. In the example, input receiver circuit 502 includes a stream packet receiver circuit 604 that receives a stream 602 of trace data from a compute circuit of a particular compute circuit type. Stream packet receiver circuit 604 is coupled to a FIFO 606. In the example, stream packet receiver circuit 604 conveys data to FIFO 606 via signal 608. Stream packet receiver circuit 604 is capable of reading the status of FIFO 606 via signal 610 (e.g., full or empty). Stream packet receiver circuit 604 is capable of indicating, by way of signal 612, that data (e.g., a packet of data) is ready in FIFO 606. Stream packet receiver circuit 604 also is capable of indicating via signal 614 when a received packet is dropped under any of the various circumstances described hereinbelow.

In one or more example implementations, stream packet receiver circuit 604 is implemented in accordance with the AXI protocol as previously discussed. As also noted, the inventive arrangements are not intended to be limited to the particular type of communication protocol and/or circuitry described. Stream packet receiver circuit 604 is capable of analyzing received packets of trace data received on stream 602 to check or determine whether full trace packets are received. Any packets that fail the check are discarded (e.g., dropped). As an illustrative and non-limiting example, stream packet receiver circuit 604 may determine whether each packet of trace data received has a correct/expected packet length. The expected packet length may be specified by the user as a configuration setting during the process illustrated in FIG. 2. In response to determining that the packet does not pass the check, stream packet receiver circuit 604 is capable of dropping the received packet. In response to dropping a received packet, stream packet receiver circuit 604 is capable of indicating the dropped packet via signal 614. In response to determining that the received packet passes the check, stream packet receiver circuit 604 is capable of writing the packet to FIFO 606. Stream packet receiver circuit 604 is capable of indicating that data is available in response to writing the packet to FIFO 606 via signal 612. In one or more example implementations, the particular validity check(s) performed by stream packet receiver circuits 604 may differ according to compute circuit type. That is, the stream packet receiver circuits 604 may perform different validity checks for different types of compute circuits.

In one or more example implementations, responsive to signal 610 indicating that FIFO 606 is full, stream packet receiver circuit 604 is capable of dropping received packets. That is, in cases where FIFO 606 does not have any available space to store an additional packet, stream packet receiver circuit 604 drops packets as received over stream 602 at least until such time as space is available in FIFO 606 for storing the received trace data. In the examples, stream packet receiver circuit 604 drops whole packets and does not keep any partial packets or partial packet data. In response to dropping a received packet, stream packet receiver circuit 604 is capable of indicating the dropped packet via signal 614. In this manner, rather than throttle the generation of trace data from the various compute circuits of IC 110, HSDP trace circuit 130 is designed to be lossy in terms of trace data collection.

In one or more example implementations, the particular metrics used to determine whether a FIFO 606 is full also may differ among input receiver circuits 502 according to the particular type of compute circuit providing data to the input receiver circuit 502.

In the example of FIG. 6, each received stream 602 as received by stream packet receiver circuit 604 of an input receiver circuit 502 may be configurable, at compile time, to have a particular bit width. For example, stream packet receiver circuit 604 may be configured to use a bit width of 32, 64, or 128 bits. Further, the input receiver circuits 502 for different types of compute circuits may have stream packet receiver circuits 604 of different widths. That is, the width of stream packet receiver circuits 604 for DP array 302 may be of a particular width (e.g., 128 bits) while the width of stream packet receiver circuits 604 for programmable logic 304 may be of a different width (e.g., 32 or 64 bits). For purposes of illustration, FIFO 606 may have a width of 256 bits. Stream packet receiver circuit 604 is capable of performing data width conversions to write data to FIFO 606 in the appropriate width. In one or more example implementations, the depth of FIFO 606 may be 64 entries. It should be appreciated, however, that the particular example widths and depths are provided for purposes of illustration only.

In the example, for purposes of discussion, the signals output from input receiver circuit 502 is referred to collectively as output signals 620. For example, output signals 620 include the data output from FIFO 606, signal 612, and signal 614.

Figure 7:
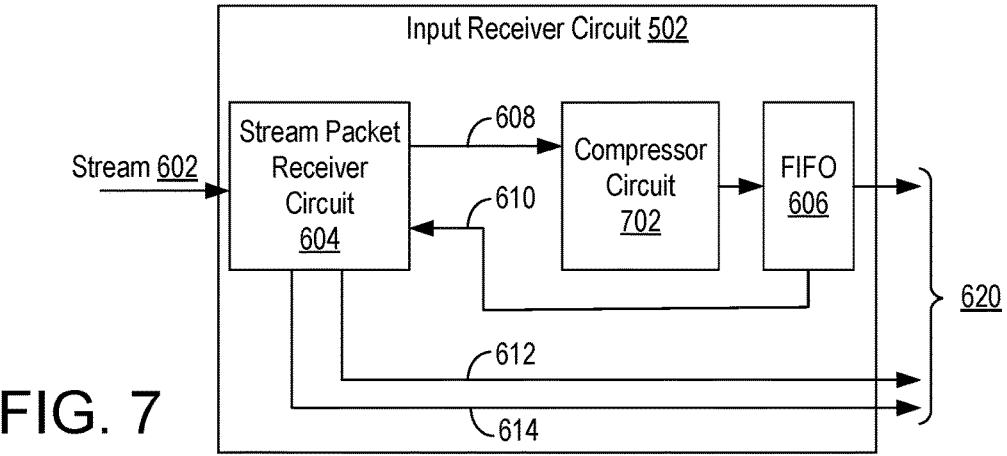
FIG. 7 illustrates another example implementation of an input receiver circuit of FIG. 5.

FIG. 7 illustrates another example implementation of input receiver circuit 502 of FIG. 5. The input receiver circuit 502 of FIG. 7 is substantially similar to the example of FIG. 6. In the example of FIG. 7, a compressor circuit 702 is included. In the example, compressor circuit 702 is operable to perform a selected type of compression on received packets of trace data. By performing compression on received data prior to such data entering FIFO 606, the likelihood of FIFO 606 filling is reduced. In this regard, inclusion of compressor circuit 702 can increase data throughput of HSDP trace circuit 130. In one or more examples, compressor circuit 702 may combine two or more packets, through compression, into one packet for storage in FIFO 606.

Figure 8:
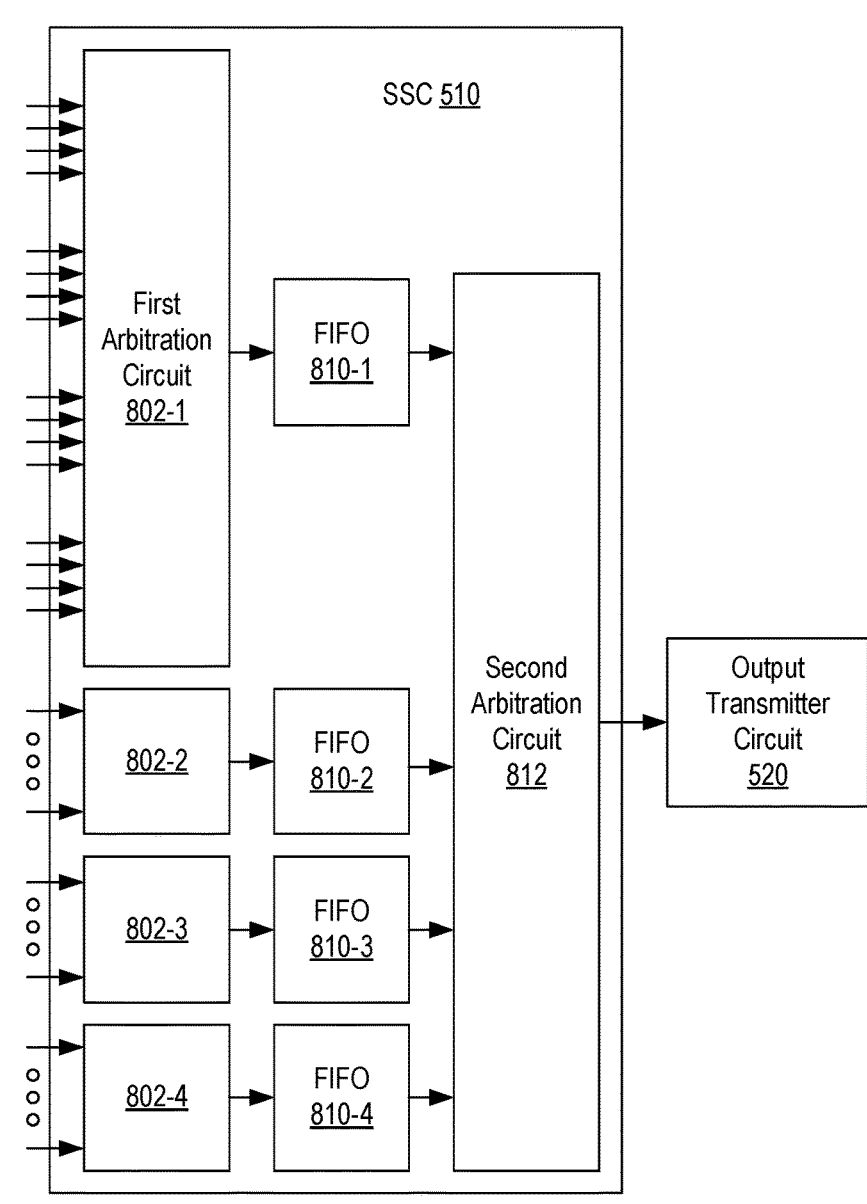
FIG. 8 illustrates an example implementation of the stream selector circuit of FIG. 5.

FIG. 8 illustrates an example implementation of SSC 510 of FIG. 5. In the example of FIG. 8, SSC 510 includes a plurality of first arbitration circuits 802, a plurality of FIFOs 810, and a second arbitration circuit 812. As shown, output transmitter circuit 520 is coupled to an output of second arbitration circuit 812. In the example, SSC 510 includes one first arbitration circuit 802 for each different type of compute circuit coupled to HSDP trace circuit 130. For example, compute circuits of DP array 302 may be coupled to first arbitration circuit 802-1, while compute circuits in programmable logic 304 may be coupled to another, different instance of first arbitration circuit 802, etc. For purposes of illustration, first arbitration circuit 802-1 is shown to receive 16 different input streams. Appreciably, as discussed, the number of first arbitration circuits included and the number of inputs received by each are configurable parameters of HSDP trace circuit 130.

Figure 9:
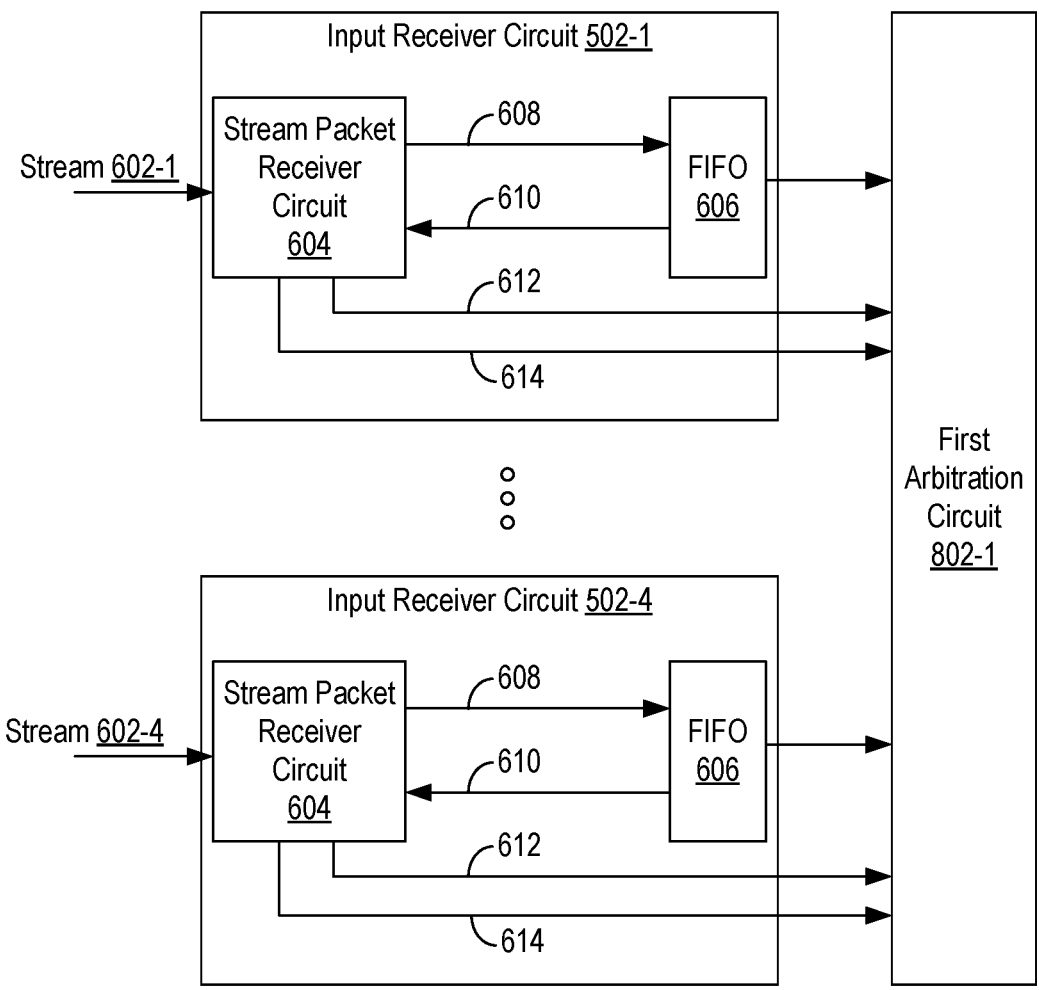
FIG. 9 illustrates an example of input receiver circuits coupled to the first arbitration circuit of the stream selector circuit.

Referring to FIGS. 6, 7 and 8 in combination, each input stream received by first arbitration circuit 802 is received from a corresponding input receiver circuit 502. That is, each arrow input to first arbitration circuit 802 represents an instance of output signals 620 from a corresponding input receiver circuits 502. FIG. 9 illustrates a more detailed example of input receiver circuits 502 coupled to first arbitration circuit 802-1.

In one or more example implementations, each first arbitration circuit 802 can include one or more different levels of arbitration. For example, each instance of a first arbitration circuit 802 may include a first level of arbitration circuits (not shown) that arbitrate among a subset of the received packets (e.g., among 4 input receiver circuits 502) and a second level arbitration circuit that arbitrates among 4 of the first level arbitration circuits.

As illustrated, each first arbitration circuit 802 is coupled to a FIFO 810. Each FIFO 810 is coupled to an input of second arbitration circuit 812. In the example, the number of FIFOs 810 will be equivalent to the number of different types of compute circuits connected to HSDP trace circuit 130. Second arbitration circuit 812 is capable of arbitrating selected packets of the different types of compute circuits by obtaining a packet from a selected one of FIFOs 810 and outputting that packet to output transmitter circuit 520.

In the example, each of first arbitration circuits 802 is capable of performing a round-robin scheduling among streams 602 of a same compute circuit type. That is, of each set of output signals 620 for a same compute circuit type as received by first arbitration circuit 802-1, first arbitration circuit 802-1 implements an arbitration scheme with respect to those input receiver circuits 502 of the set that have data available.

For example, each first arbitration circuit 802 monitors signal 612 from each stream packet receiver circuit 604 of a connected input receiver circuit 502 connected thereto. Among those FIFOs 606 that have available data, each first arbitration circuit 802 selects a non-empty FIFO 606, reads one packet of data therefrom, and outputs the packet of data to the corresponding FIFO 810. Thereafter, each first arbitration stage circuit 802 moves on to the next non-empty FIFO 606 in accordance with the arbitration scheme implemented therein. In one aspect, the next non-empty FIFO 606 may be selected while each first arbitration circuit 802 is reading a packet from the selected non-empty FIFO 606 such that there are no clock cycles between consecutive reads of FIFOs 606 presuming data is available in a next non-empty FIFO 606.

In one or more example implementations, the arbitration scheme implemented by first arbitration stage circuits 802 is a round-robin arbitration scheme. Within this disclosure, an input of a first arbitration circuit 802 that has data (e.g., the FIFO 606 coupled to the input is non-empty) is said to be active. For purposes of illustration, consider an example in which only one input of first arbitration circuit 802-1 is active. In that case, first arbitration circuit 802-1 selects the input receiver circuit 502 that is active and conveys the data to FIFO 810.

In another example, first arbitration circuit 802-1 has multiple active inputs 2, 4, 5, 7, 10, 11, 12, 15, and 16. In that case, if the last selection was input 8, the round-robin arbitration performed selects the next higher input that is active. In this example, if the last selected input was 8, the next highest active input is 10. That is, the round-robin arbitration selects the input of the lowest number that is higher than the previously selected input. First arbitration circuit 802-1 continues (presuming the same set of active inputs) by selecting 11, then, 12, then 15, and then 16. Once input 16 is selected, the round-robin arbitration loops around to start from input 1. In this example, since input 1 is not active, the next selected input following input 16 is input 2. The round-robin arbitration priorities an increasing order of inputs.

In another example, presuming active inputs of 2, 4, 5, 7, and 8 with the last selected input being 8, the round-robin arbitration loops around and selects input 2 as the next active input since no active input exists with an index larger than 8.

Second arbitration circuit 812 is capable of implementing a same arbitration scheme implemented by first arbitration circuits 802. Second arbitration circuit 812 may select a particular FIFO 810 from which a packet of data is obtained and output that packet of data to output transmitter circuit 520.

In one or more example implementations, SSC 510 is capable of including the compute circuit type identifiers into the trace data. For example, second arbitration circuit 812 may be configured to include compute circuit type identifiers into the respective packets of trace data as received from FIFOs 810. In the example, each FIFO 810 includes packets corresponding to only a single type of compute circuit. Thus, second arbitration circuit 812 may insert compute circuit type identifiers into packets as received based on each respective input port. That is, each packet received from FIFO 810-1 will have a same compute circuit type identifier inserted therein, while each packet received from FIFO 810-2 will have a same compute circuit type identifier inserted therein (though different from the identifier inserted into packets from FIFO 810-1), etc.

While round-robin arbitration is used as an example arbitration scheme, in other example implementations, other arbitration schemes may be used. For example, an arbitration scheme that prioritizes particular compute circuits and/or particular compute circuit types may be implemented by first arbitration circuits 802 and second arbitration circuits 812.

Figure 10:
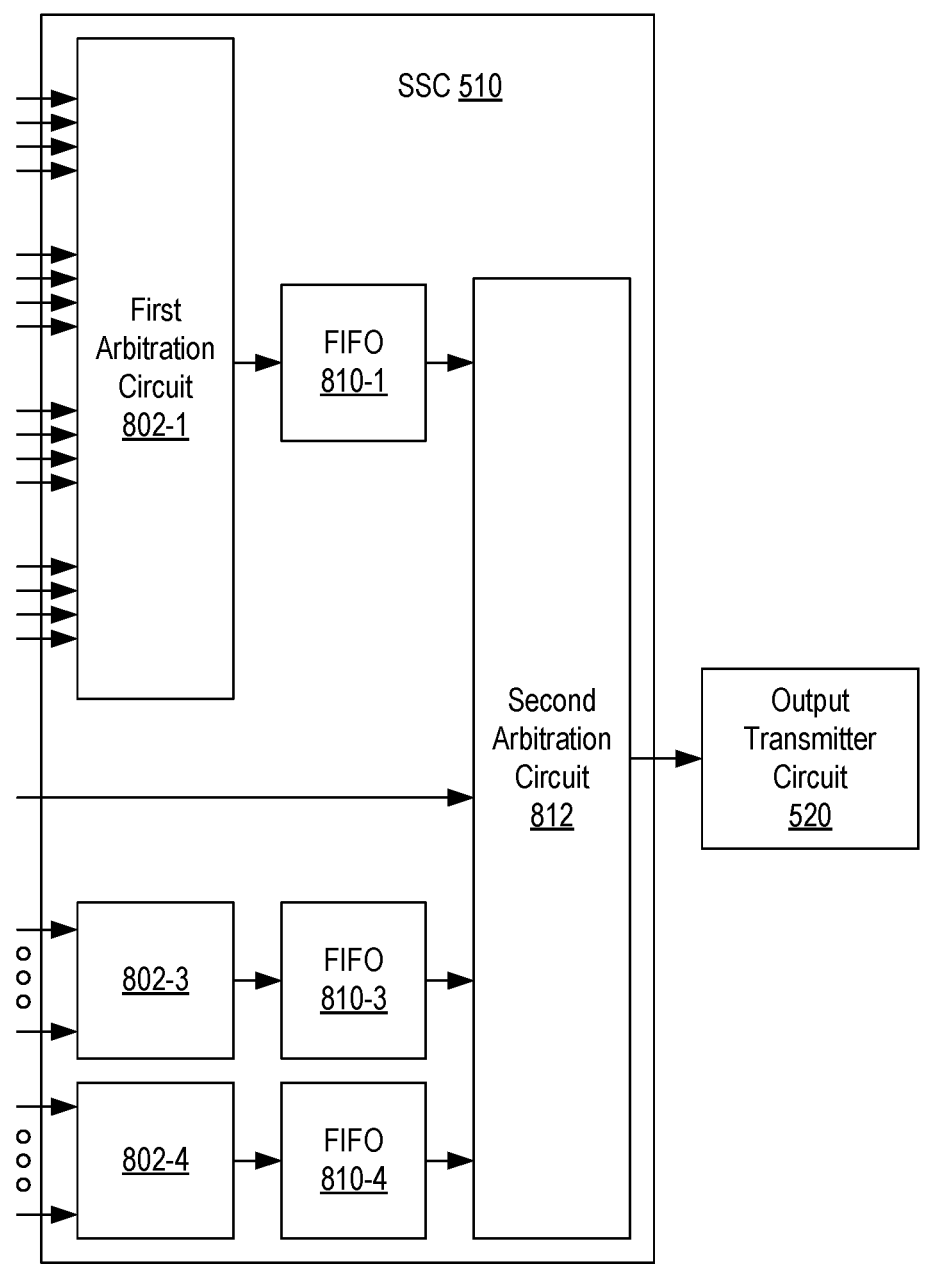
FIG. 10 illustrates another example implementation of the stream selector circuit of FIG. 5.

FIG. 10 illustrates another example implementation of SSC 510. In the example of FIG. 10, first arbitration circuit 802-2 and FIFO 810-3 have been removed. FIG. 10 illustrates an example implementation where only one stream of trace data is received from a particular type of compute circuit. For example, the single stream of trace data from compute circuits implemented in programmable logic 304 as illustrated in FIGS. 4A and 4B may bypass the first arbitration circuitry and be received directly by the second arbitration circuit 812. That is, the output from the input receiver circuit 502 that receives the single stream of trace data may be provided directly to second arbitration circuit 812. This type of architecture may be used for any compute circuit types that collectively output a single stream of trace data.

In the examples of FIGS. 5, 8, and 10, when streams from more than one type of compute circuit are present, HSDP trace circuit 130 is capable of implementing two-level round-robin scheduling. Further, it should be appreciated that the different configurations illustrated in FIGS. 5, 8, and 10, and variations thereof, may be implemented by virtue of selecting different implementation options at compile time of HSDP trace circuit 130. Further, the use of compression in any of the various circuit blocks illustrated may be specified by selecting different implementation options at compile time. Compression may be selectively included on a per circuit block (e.g., within any one or more or all of input receiver circuits 502 and/or in output transmitter circuit 520).

Figure 11:
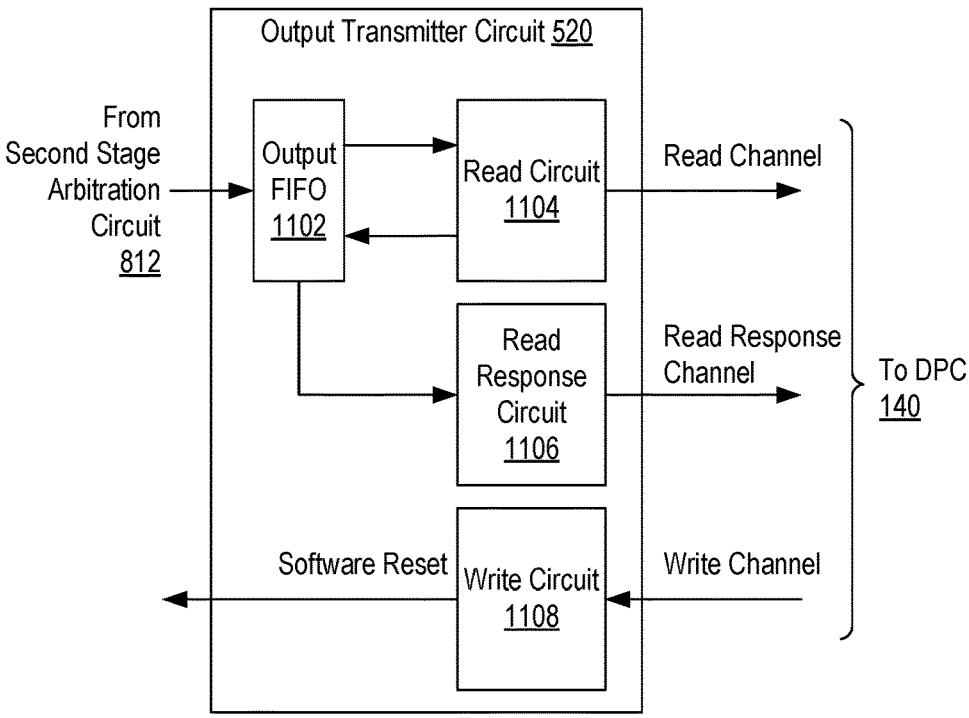
FIG. 11 illustrates an example implementation of an output transmitter circuit of the HSDP trace circuit.

FIG. 11 illustrates an example implementation of output transmitter circuit 520. In an example implementation, output transmitter circuit 520 implements a memory mapped interface (e.g., an AXI memory mapped interface) that is accessible by DPC 140. In the example, each output transmitter circuit 520 includes an output FIFO 1102, a read circuit 1104, a read response circuit 1106, and a write circuit 1108. Output FIFO 1102 is capable of storing data output from second arbitration circuit 812. For purposes of illustration, read circuit 1104, read response circuit 1106, and write circuit 1108 may be implemented as AXI read, AXI read response, and AXI write circuits, respectively. As discussed, AXI is used for purposes of illustration and not-limitation.

In the example of FIG. 11, output FIFO 1102 includes trace data for more than one type of compute circuit type unlike FIFOs 810. In response to a read request from DPC 140 received by read circuit 1104, read response circuit 1104 outputs data presuming data is available. If output FIFO 1102 is empty, the read response channel may output an error in response to the read request.

In the example, write circuit 1108 may receive a request via the write channel. In the example, the request may be for a software reset. Write circuit 1108 may convey the software reset to one or more other components of HSDP trace circuit 130 thereby causing a reset of HSDP trace circuit 130. For example, in response to a software reset, the circuit blocks of HSDP trace circuit 130 (e.g., FIFOs, SSC 510, and any AXI/communication circuits) may be reset or cleared. In one or more other examples, circuits and/or systems other than DPC 140 may submit a reset request to write circuit 1108.

Figure 12:
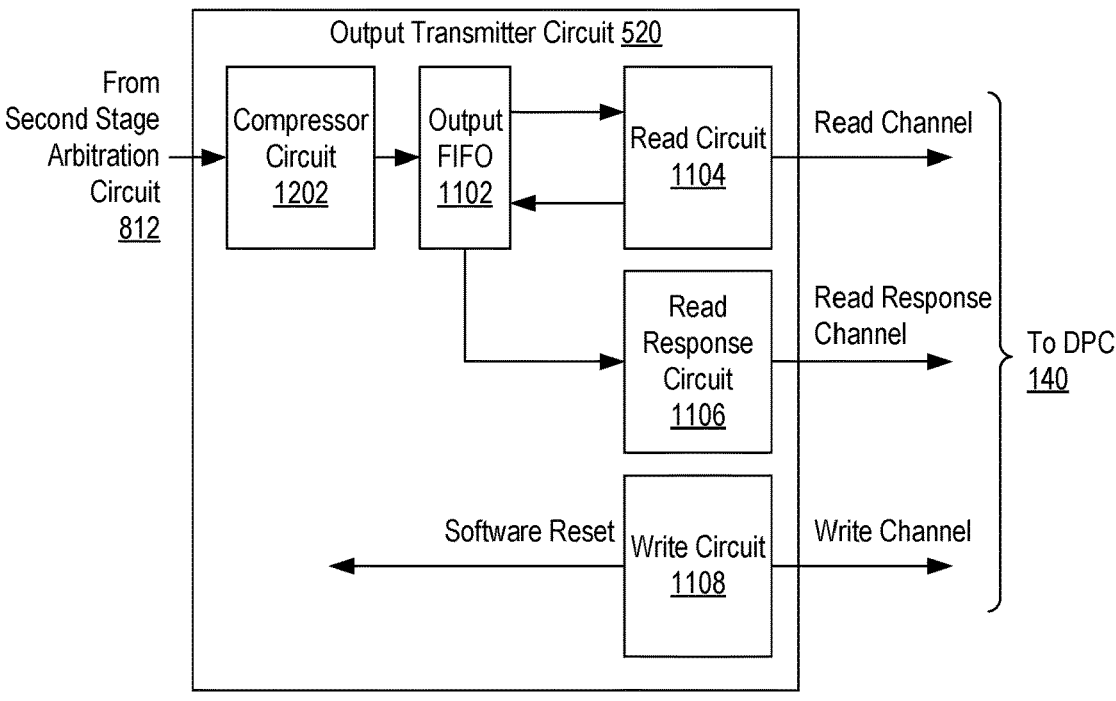
FIG. 12 illustrates another example implementation of an output transmitter circuit of the HSDP trace circuit.

FIG. 12 illustrates another example implementation of output transmitter circuit 520. The example of FIG. 12 may be substantially similar to the example described in connection with FIG. 11. In the example of FIG. 12, a compressor circuit 1202 is included. Compressor circuit 1202 is capable of compressing a plurality of packets that may be from different compute circuits into a single packet that may be stored in output FIFO 1102. Compressor circuit 1202 may operate in a manner similar to compressor circuit 702 and provide similar benefits in terms of data throughput by reducing the likelihood that output FIFO 1102 becomes full.

It should be appreciated that throughout the circuit architecture illustrated, back pressure may be asserted as FIFOs fill. That is, as a FIFO fills, those circuits prior to the FIFO are unable to continue writing data. This may propagate back to the input receiver circuits 502 causing received packets of trace data to be dropped.

The example implementations described herein maintain packet ordering on a per stream basis. That is, for a given stream of trace data that is received, the ordering of packets as received by HSDP trace circuit 130 is maintained. Packets, however, may be out of order across the different streams of trace data as received.

Figure 13:
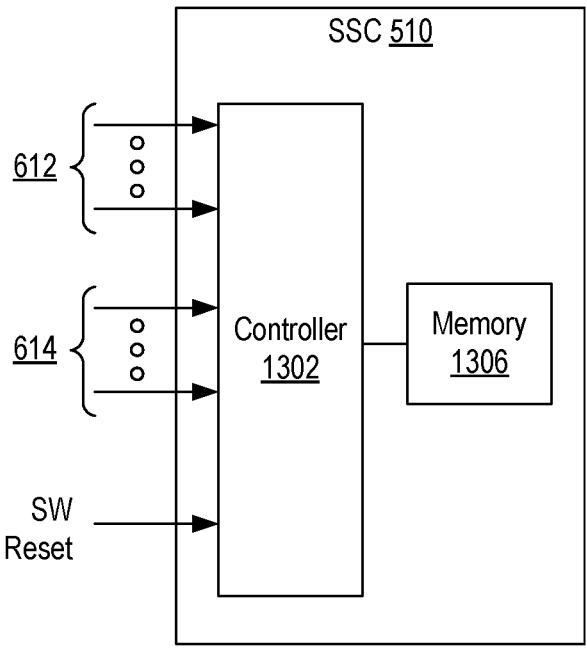
FIG. 13 illustrates an example implementation of the stream selector circuit that is configured to store packet loss information.

FIG. 13 illustrates an example implementation of SSC 510 that is configured to store packet loss information. In the example of FIG. 13, certain components of SSC 510 such as first arbitration circuits 802, FIFOs 810, and second arbitration circuit 812, are not illustrated. In the example, SSC 510 may include a controller 1302 that receives various signals such as signals 612, 614, and/or the software reset signal.

In one or more example implementations, controller 1302 is capable of tracking the number of packets received and the number of packets dropped or lost based on signals 612 and 614. Controller 1302 is capable of storing a count of packets received and packets lost in memory 1306 (e.g., a register). In one or more examples, controller 1302 may calculate a packet loss ratio that is stored in memory 1306 in addition to and/or in lieu of the respective packets received and packets lost counts.

In one or more example implementations, the various packet loss information described herein, e.g., packets received, packets lost, and/or the packet loss ratio) may be determined by controller 1302 across all received streams of trace data (e.g., across different compute circuits of different compute circuit types). In another example, controller 1302 may determine the packet loss information on a per compute circuit type basis. In that case, one packets received count, one packets lost count, and/or one packet loss ratio would be stored in memory 1306 for DP array 302, another of each data item would be stored for compute circuits in programmable logic 304, etc. In another example, controller 1302 may determine such data items on a per stream basis. In that case, the various data items of packet loss information would be stored for each individual stream of trace data received by HSDP trace circuit 130. Still, depending on the configuration options selected at compile time, any combination of the foregoing may be implemented depending on the granularity of metrics desired for different streams of trace data, compute circuits, and/or compute circuit types.

In the example of FIG. 13, the packet loss information may be read from memory 1306 and output from IC 110 by way of the interface illustrated in FIGS. 11 and/or 12 of the output transmitter circuit 520. In another example implementation, an additional interface may be included such as an AXI-Lite interface through which the packet loss information may be read and/or output from IC 110.

FIG. 14 illustrates an example method 1400 of operation of HSDP trace circuit 130. In block 1402, HSDP trace circuit 130 receives a plurality of streams of trace data from a plurality of compute circuits of different compute circuit types. The plurality of compute circuits and HSDP trace circuit 130 are disposed in a same IC (e.g., IC 110). In block 1404, HSDP trace circuit 130 performs a first stage arbitration among the plurality of streams of trace data originating from same compute circuit types. For example, each of the first arbitration circuits 802 performs arbitration concurrently.

In block 1406, HSDP trace circuit 130 performs a second stage arbitration among streams of trace data corresponding to different compute circuit types generating output trace data. For example, the second arbitration circuit 812 performs arbitration among data packets of different compute circuit types.

In block 1406, the second arbitration circuit 812 is capable of inserting compute circuit type identifiers within the output trace data that is generated. As noted, the compute circuit type identifiers specify the compute circuit type that originated each portion of trace data of the output trace data. The second arbitration circuit 812 is capable of inserting a compute circuit type identifier into each packet of trace data as received. In block 1408, HSDP trace circuit 130 outputs the output trace data. For example, second stage arbitration circuit 812 outputs data to output transmitter circuit 520. Output transmitter circuit 520 outputs data to another entity such as the DPC 140 in response to read requests received therefrom.

FIG. 15 illustrates an example implementation of a data processing system 1500. Data processing system 1500 is an example of a system that may be used to implement the flow described in connection with FIG. 2. In addition, data processing system 1500 is an example of a host data processing system that may operate in coordination and in communication with an IC 110 and external device 150 as described herein.

As defined herein, the term "data processing system" means one or more hardware systems configured to process data, each hardware system including at least one hardware processor and memory, wherein the hardware processor is programmed with computer-readable instructions that, upon execution, initiate operations. Data processing system 1500 can include a hardware processor 1502, a memory 1504, and a bus 1506 that couples various system components including memory 1504 to hardware processor 1502.

Hardware processor 1502 may be implemented as one or more hardware processors. In an example, hardware processor 1502 is implemented as a central processing unit (CPU). Hardware processor 1502 may be implemented as one or more circuits capable of carrying out instructions contained in program code. The circuits may be implemented as an integrated circuit or embedded in an integrated circuit. Hardware processor 1502 may be implemented using a complex instruction set computer architecture (CISC), a reduced instruction set computer architecture (RISC), a vector processing architecture, or other known architectures. Example hardware processors include, but are not limited to, hardware processors having an x86 type of architecture (IA-32, IA-64, etc.), Power Architecture, ARM processors, and the like.

Hardware processor 1502 is an example of a processor that may execute an application and initiate and/or control operation of compute circuits 120 such as DP array 302 and/or programmable logic 304 within IC 110. In this regard, hardware processor 1502 may enter a hung state where the hardware processor is non-responsive to received input and/or discontinues operation. In the example, the program code executed by hardware processor 1502 is the application that offloads tasks to compute circuits 120 of IC 110. In this example, execution of that application is terminated or disrupted. As discussed, disruption of the application and/or hardware processor 1502 (e.g., whether hardware processor 1502 or an embedded processor within processor system 306 of IC 110 that may execute the application) will not affect or interrupt the collection of trace data as performed by the inventive arrangements described herein. That is, operations such as receiving trace data, processing the trace data, packetizing the trace data, sending the trace data to external device 150, and storing the trace data are unaffected and may continue to operate uninterrupted.

Bus 1506 represents one or more of any of a variety of communication bus structures. By way of example, and not limitation, bus 1506 may be implemented as a Peripheral Component Interconnect Express (PCIe) bus. Data processing system 1500 typically includes a variety of computer system readable media. Such media may include computer-readable volatile and non-volatile media and computer-readable removable and non-removable media.

Memory 1504 can include computer-readable media in the form of volatile memory, such as random-access memory (RAM) 1508 and/or cache memory 1510. Data processing system 1500 also can include other removable/non-removable, volatile/non-volatile computer storage media. By way of example, storage system 1512 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1506 by one or more data media interfaces. Memory 1504 is an example of at least one computer program product.

Memory 1504 is capable of storing computer-readable program instructions that are executable by hardware processor 1502. For example, the computer-readable program instructions can include an operating system, one or more application programs, other program code, and program data. In one example, the program code may include instructions that, when executed, cause hardware processor 1502 to perform the operations described in connection with FIG. 2. Hardware processor 1502, in executing the computer-readable program instructions, is capable of performing the various operations described herein that are attributable to a computer. It should be appreciated that data items used, generated, and/or operated upon by data processing system 1500 are functional data structures that impart functionality when employed by data processing system 1500. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a hardware processor.

Data processing system 1500 may include one or more Input/Output (I/O) interfaces 1518 communicatively linked to bus 1506. I/O interface(s) 1518 allow data processing system 1500 to communicate with one or more external devices and/or communicate over one or more networks such as a local area network (LAN), a wide area network (WAN), and/or a public network (e.g., the Internet). Examples of I/O interfaces 1518 may include, but are not limited to, network cards, modems, network adapters, hardware controllers, etc. Examples of external devices also may include devices that allow a user to interact with data processing system 1500 (e.g., a display, a keyboard, and/or a pointing device) and/or other devices such as accelerator card.

Data processing system 1500 is only one example of computer hardware and/or a host data processing system. Data processing system 1500 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 15 is not intended to suggest any limitation as to the scope of use or functionality of example implementations described herein. Data processing system 1500 is an example of computer hardware that is capable of performing the various operations described within this disclosure. In this regard, data processing system 1500 may include fewer components than shown or additional components not illustrated in FIG. 15 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a hardware processor may include at least some memory.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A integrated circuit-implemented method, comprising:

receiving, by a high-speed debug port trace (HSDPT) circuit of an integrated circuit (IC), streams of trace data from a plurality of compute circuits implemented in a data processing array and in programmable logic of the IC, wherein a user design including the HSDPT circuit is compiled for implementation in the IC;

arbitrating, by a first stage arbitration circuit of the HSDPT circuit, only among the streams of trace data from the data processing array and arbitrating, by a different first stage arbitration circuit of the HSDPT circuit, only among the streams of trace data from the programmable logic;

inserting, by a second stage arbitration circuit of the HSDPT circuit, compute circuit type identifiers within packets of the trace data based on a particular first stage arbitration circuit from which the trace data is received, wherein each compute circuit type identifier specifies a compute circuit type that originated each portion of the trace data;

outputting the trace data to a trace data capture system located external to the integrated circuit;

compressing the trace data prior to the outputting;

dropping one or more packets of trace data within one or more of the plurality of streams of trace data in response to detecting back pressure or a failed check for expected packet length;

tracking the one or more packets of trace data that were dropped; and storing packet loss information within the HSDPT circuit, wherein the packet loss information indicates the one or more packets of trace data that were dropped.

2. The integrated circuit-implemented method of claim 1, wherein each of the first stage arbitration circuit and the different first stage arbitration circuit arbitrates among two or more streams of trace data originating from a same compute circuit type and performs a separate arbitration.

3. The integrated circuit-implemented method of claim 1, wherein, for a single stream of trace data received from one or more compute circuits of a selected compute circuit type, the single stream bypasses first stage arbitration and is arbitrated by the second stage arbitration circuit.

4. The integrated circuit-implemented method of claim 1, further comprising:

compressing the streams of trace data prior to the arbitrating by the first stage arbitration circuit and the different first stage arbitration circuit.

5. The integrated circuit-implemented method of claim 1, wherein the HSDPT circuit is implemented using programmable circuitry and a number of the streams of trace data received from each different compute circuit type is user-specified.

6. The integrated circuit-implemented method of claim 5, wherein the data processing array is configured to provide two or more streams of the streams of trace data to the HSDPT circuit.

7. The integrated circuit-implemented method of claim 1, wherein the HSDPT circuit:

operates as an agent of the plurality of compute circuits in receiving the streams of trace data from the plurality of compute circuits; and operates as an agent of a debug packet controller configured to packetize the trace data for further transmission.

8. An integrated circuit including a high-speed debug port trace (HSDPT) circuit, wherein the HSDPT circuit comprises:

a plurality of input receiver circuits each configured to receive a stream of trace data, wherein the plurality of input receiver circuits receive streams of trace data from a plurality of compute circuits of different compute circuit types, wherein the plurality of compute circuits are within the integrated circuit;

wherein the input receiver circuits are configured to drop one or more packets of trace data within respective ones of the streams of trace data in response to detecting back pressure or a failed check for expected packet length;

a stream selector circuit configured to perform multiple stages of arbitration among the plurality of streams of trace data to generate output trace data;

wherein the stream selector circuit includes a first stage arbitration circuit configured to arbitrate only among trace data from a data processing array and a different first stage arbitration circuit configured to arbitrate only among trace data from programmable logic;

wherein the stream selector circuit includes a second stage arbitration circuit configured to;

insert compute circuit type identifiers within packets of the trace data based on a particular first stage arbitration circuit from which the trace data is received, wherein each compute circuit type identifier specifies a compute circuit type that originated each portion of trace data; and an output transmitter circuit configured to output the trace data, wherein the output transmitter circuit includes a compressor circuit configured to compress the trace data prior to storage of the trace data within a first-in-first-out memory;

wherein the HSDPT circuit further comprises a controller configured to track packets of trace data dropped from the streams of trace data and a memory coupled to the controller, wherein the controller is configured to store packet loss information within the memory, wherein the packet loss information indicates an amount of trace data that was dropped;

wherein the HSDPT is compiled within a circuit design for implementation the integrated circuit.

9. The integrated circuit of claim 8, wherein the first stage of arbitration is performed separately for each set of two or more streams of trace data originating from a same compute circuit type.

10. The integrated circuit of claim 8, wherein, for a single stream of trace data received from one or more compute circuits of a selected compute circuit type of the different compute circuit types, the single stream bypasses the first stage arbitration circuits and is arbitrated by the second stage arbitration circuit.

11. The integrated circuit of claim 8, wherein one or more of the plurality of input receiver circuits comprises a compressor circuit configured to compress the stream of trace data as received prior to storage of the stream of trace data within a first-in-first-out memory.

12. The integrated circuit of claim 8, wherein the HSDPT circuit is implemented using programmable circuitry and a number of the plurality of streams of trace data received from each different compute circuit type is user-specified.

13. The integrated circuit of claim 8, wherein:

each input receiver circuit operates as an agent of a respective one of the plurality of compute circuits in receiving a respective stream of trace data; and the output transmitter circuit operates as an agent of a debug packet controller configured to packetize the trace data for further transmission.

* * * * *